US012131726B2

(12) United States Patent
Liang et al.

(10) Patent No.: US 12,131,726 B2
(45) Date of Patent: Oct. 29, 2024

(54) SOUND SUPPRESSION APPARATUS, SOUND SUPPRESSION SYSTEM AND WEARABLE SOUND DEVICE

(71) Applicant: xMEMS Labs, Inc., Santa Clara, CA (US)

(72) Inventors: Jemm Yue Liang, Sunnyvale, CA (US); Hsi-Sheng Chen, Fremont, CA (US); Chieh-Yao Chang, Taipei (TW)

(73) Assignee: xMEMS Labs, Inc., Santa Clara, CA (US)

( * ) Notice: Subject to any disclaimer, the term of this patent is extended or adjusted under 35 U.S.C. 154(b) by 0 days.

(21) Appl. No.: 18/608,899

(22) Filed: Mar. 18, 2024

(65) Prior Publication Data

US 2024/0321255 A1 Sep. 26, 2024

Related U.S. Application Data

(60) Provisional application No. 63/541,867, filed on Oct. 1, 2023, provisional application No. 63/453,473, filed on Mar. 21, 2023.

(51) Int. Cl.

*H04R 1/10* (2006.01)
*B06B 1/02* (2006.01)
*G10K 11/178* (2006.01)

(52) U.S. Cl.

CPC ...... *G10K 11/17881* (2018.01); *B06B 1/0292* (2013.01); *G10K 11/17815* (2018.01); *G10K 11/17833* (2018.01); *G10K 11/17853* (2018.01); *G10K 11/17857* (2018.01); *H04R 1/1016* (2013.01); *H04R 1/1075* (2013.01); *H04R 1/1083* (2013.01); *G10K 2210/103* (2013.01); *G10K 2210/1081* (2013.01); *G10K 2210/12* (2013.01); *G10K 2210/3026* (2013.01); *G10K 2210/3028* (2013.01); *G10K 2210/3219* (2013.01); *G10K 2210/3221* (2013.01); *H04R 2410/01* (2013.01); *H04R 2460/01* (2013.01)

(58) Field of Classification Search

CPC ....... G10K 11/17881; G10K 11/17815; G10K 11/17833; G10K 11/17853; G10K 11/17857; G10K 2210/103; G10K 2210/1081; G10K 2210/12; G10K 2210/3026; G10K 2210/3028; G10K 2210/3219; G10K 2210/3221; B06B 1/0292; H04R 1/1016; H04R 1/1075; H04R 1/1083; H04R 2410/01; H04R 2460/01

USPC .......................... 381/71, 71.2, 71.1, 71.8, 77

See application file for complete search history.

(56) References Cited

U.S. PATENT DOCUMENTS 5,834,647 A * 11/1998 Gaudriot .......... G10K 11/17857 381/71.8
5,889,869 A * 3/1999 Botros ............ G10K 11/17875 381/71.11
6,434,239 B1 * 8/2002 DeLuca ........... G10K 11/17875 381/71.8
2024/0135913 A1 * 4/2024 Pang ................ G10K 11/17853

* cited by examiner

*Primary Examiner* — Carolyn R Edwards
*Assistant Examiner* — Friedrich Fahnert
(74) *Attorney, Agent, or Firm* — Winston Hsu

(57) ABSTRACT

The sound suppression apparatus comprises a sound sensing device, configured to sense a sound; and a sound producing device comprising an air-pulse generating device, configured to generate a plurality of air pulses at an ultrasonic pulse rate. The plurality of air pulses at the ultrasonic pulse rate forms an anti-sound. The anti-sound comprises a component which is configured to suppress the sound.

28 Claims, 18 Drawing Sheets

SOUND SUPPRESSION APPARATUS, SOUND SUPPRESSION SYSTEM AND WEARABLE SOUND DEVICE

CROSS REFERENCE TO RELATED APPLICATIONS

This application claims the benefit of U.S. Provisional Application No. 63/453,473, filed on Mar. 21, 2023. Further, this application claims the benefit of U.S. Provisional Application No. 63/541,867, filed on Oct. 1, 2023. The contents of these applications are incorporated herein by reference.

BACKGROUND OF THE INVENTION

1. Field of the Invention

The present application relates to a sound suppression apparatus, sound suppression system and wearable sound device, and more particularly, to a sound suppression apparatus, sound suppression system and wearable sound device capable of suppressing broadband noise.

2. Description of the Prior Art

Speaker driver and back enclosure are two major design challenges in the conventional speaker industry. It is difficult for a conventional speaker to cover an entire audio frequency band, e.g., from 20 Hz to 20 KHz. To produce sound of broad audible band with desirable sound pressure level (SPL), both the radiating/moving surface and volume/size of back enclosure for the conventional speaker are required to be large. Given the large size of the speak producing sound of wide audible band, it is difficult to perform full band noise suppression, especially in the open field.

Furthermore, conventional speak (e.g., dynamic driver) produces inconsistent phase throughout the entire audible band. In other words, phase (produced by conventional speak) at low frequency is quite different from phase at high frequency. Such phase inconsistency would make noise cancellation/suppression more difficult to deal with, which is also a challenge of traditional ANC (active noise cancellation).

Therefore, how to surpass existing technique is a significant objective in the field.

SUMMARY OF THE INVENTION

It is therefore a primary objective of the present application to provide a sound suppression apparatus, sound suppression system and wearable sound device capable of suppressing broadband noise, to improve over disadvantages of the prior art.

An embodiment of the present invention provides a sound suppression apparatus. The sound suppression apparatus comprises a sound sensing device, configured to sense a sound; and a sound producing device comprising an air-pulse generating device, configured to generate a plurality of air pulses at an ultrasonic pulse rate. The plurality of air pulses at the ultrasonic pulse rate forms an anti-sound. The anti-sound comprises a component which is configured to suppress the sound.

An embodiment of the present invention provides sound suppression system. The sound suppression system comprises a plurality of sound suppression apparatuses arranged in an array. Each sound suppression apparatus comprises a sound sensing device configured to sense a sound and a sound producing device configured to produce an anti-sound. The anti-sound is configured to suppress the sound.

An embodiment of the present invention provides a wearable sound device. The wearable sound device comprises a sound sensing device configured to sense a sound; and a sound producing device configured to produce an anti-sound. The anti-sound comprises a component which is configured to suppress the sound. The sound producing device producing the anti-sound is located outside an ear canal.

These and other objectives of the present invention will no doubt become obvious to those of ordinary skill in the art after reading the following detailed description of the preferred embodiment that is illustrated in the various figures and drawings.

DETAILED DESCRIPTION

Content of U.S. application Ser. Nos. 16/125,761, 17/553,806 and 18/321,759 is incorporated herein by reference.

U.S. application Ser. Nos. 16/125,761, 17/553,806 and 18/321,759 discloses an APG (APG: air-pulse generating/generator) device, operating under the APPS (APPS: air pressure pulse speaker) sound producing principle, can produce audible sound by modulating the amplitudes of ultrasonic acoustic pulses at an ultrasonic pulse rate far above human audible range, such that each of the generated ultrasonic acoustic pulse has an asymmetry, relative to the ambient air pressure, that is proportional to the amplitude, sampled at the ultrasonic acoustic pulse rate, of the audible sound to be produced.

The APG device disclosed in Ser. No. 18/321,759 may be fabricated using MEMS techniques with small size and produce load sound. In an embodiment, the APG device disclosed in Ser. No. 18/321,759 may have a L×W×H dimension of $5.68\times5.28\times0.85\ mm^3$ (L: length, W: width, H: height, mm: millimeter), and be able to generate SPL (SPL: sound pressure level) of 78+2 dB over 10 Hz~20 KHz, at a distance of 1 meter away. Note that, since a wavelength corresponding to a sound of 20 KHz is substantially 346/20K=17.3 mm, the physical implementation of the APG device has an L/W/H dimension smaller than a third wavelength $\lambda/3$ of a 20 KHz sound. In other words, a dimension (which can be L, W or H) of the APG device is less than a wavelength corresponding to a maximum noise frequency of noise (e.g., 20 KHz stated in the above) to be suppressed. Or, $(W+L+H)/2\leq\lambda/\pi$, where $\lambda$ is wavelength corresponding to maximum noise frequency of noise to be suppressed.

Another aspect of the APG device is the obliteration of the need for back enclosures, which are used in most conventional speakers to contain the back-radiating sound waves in order to prevent front-/back-radiating sound waves from cancelling each other. As discussed in Ser. Nos. 16/125,761 and 18/321,759 (and reference(s) therein), by taking advantage of an aspect of APPS operation to cause the audible (baseband) radiation from the back side (or facing internal volume of a hosting device) of the APG device to be much weaker than the audible (baseband) radiation from front side (or facing an ambient of a hosting device) of the APG device. In an embodiment, back-radiating wave may be weaker than front-radiating wave by a factor of 5~50 times, but not limited thereto. In this case, the SPL will not fluctuate much even the front-/back-radiating sound waves were to cancel each other.

As will be discussed below, such small size of APG speaker is instrumental in achieving acoustic nodal response (i.e., establishing a quiet zone or a pocket of silence (POS)) over broad audible band.

Figure 1:
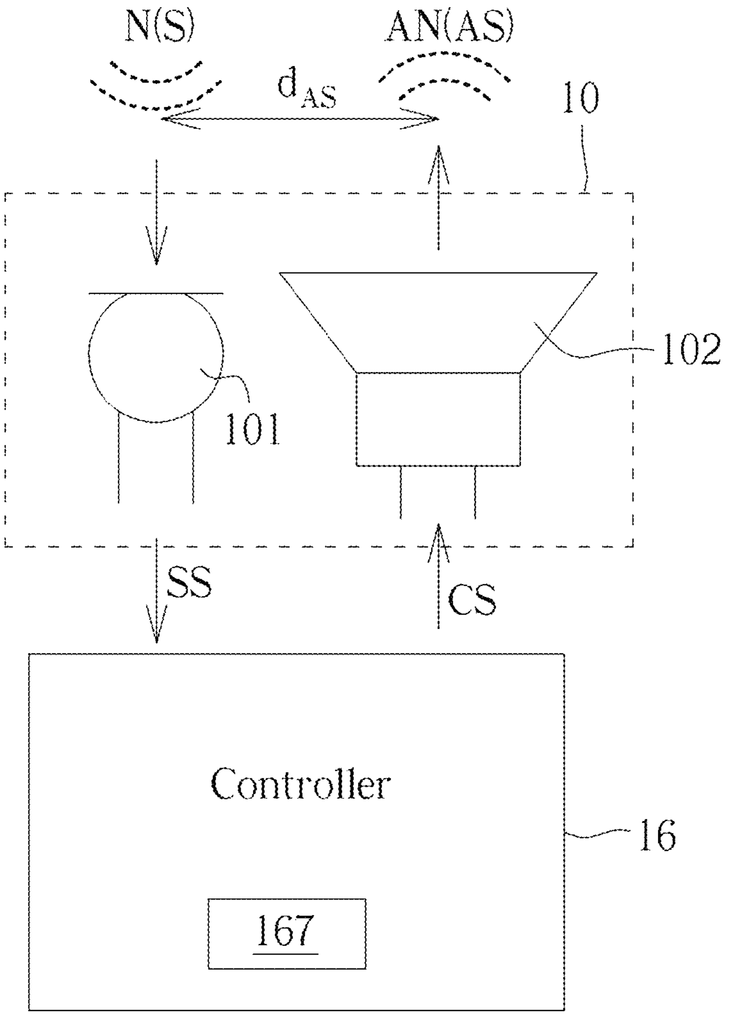
FIG. 1 is a schematic diagram of a sound suppression apparatus according to an embodiment of the present application.

FIG. 1 illustrates a schematic diagram of a sound suppression apparatus 10 according to an embodiment of present application. In the present application, the sound suppression apparatus may also be referred as acoustic nodal terminal (abbreviated as ANT), capable of forming a local quiet zone or a POS (where ANT and sound suppression apparatus are used interchangeably in the present application). The sound suppression apparatus 10 comprises a sound sensing device (SSD, e.g., microphone) 101 and a sound producing device (SPD) 102. The SSD 101 may be disposed close or with proximity to the SPD 102. The SSD is configured to sense a sound S or a noise N (a kind of undesirable sound from users' perspective). The SPD 102 may be realized by APG device according to the teaching from Ser. Nos. 16/125,761, 17/553,806 and/or 18/321,759. It can be regarded that the SPD comprises the APG device. The APG device is configured to generate a plurality of air pulses UAP at an ultrasonic pulse rate. The plurality of air pulses at the ultrasonic pulse rate would forms an anti-sound AS. In general, the anti-sound AS comprises a sound component or an anti-noise component AN, wherein the anti-noise component AN is configured suppress the undesirable noise N.

Figure 20:
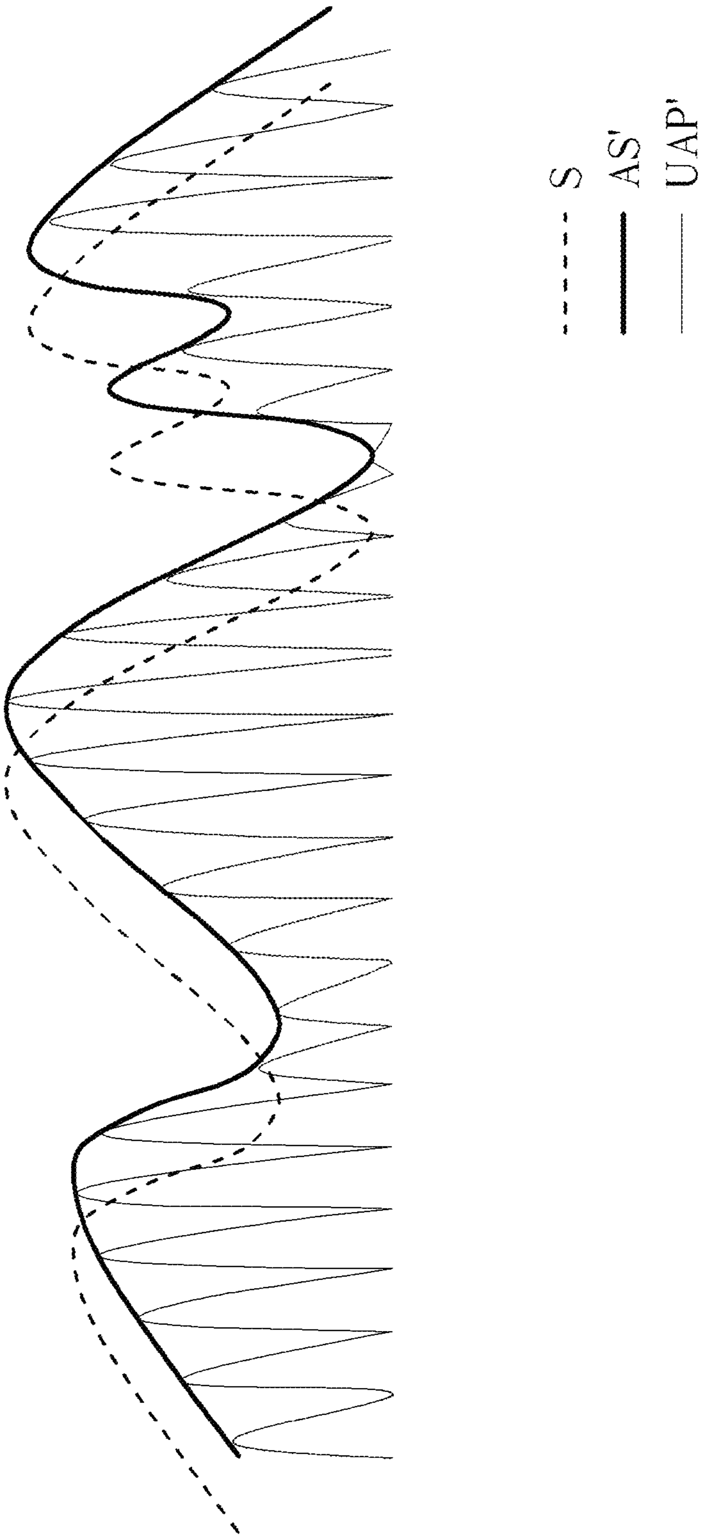
FIG. 20 illustrates a schematic diagram of waveforms of sound, anti-sound and ultrasonic air pulses.

FIG. 20 illustrates waveforms of sound S, an image of anti-sound AS' and an image of ultrasonic air pulses UAP', where the images AS' and UAP' represents or can be viewed as negative of anti-sound AS and the ultrasonic air pulses UAP generated by APG 102, which can be expressed as AS'=−AS and UAP'=−UAP. AS/AS' may be viewed as an envelope or a low frequency component of the UAP/UAP'. As can be seen from FIG. 20, within the quiet zone or POS, the sound S would be almost annihilated by the anti-sound AS and/or ultrasonic air pulses UAP. As a result, magnitude of residual sound S−AS' (or S+AS) or S−UAP' (or S+UAP) would be too low to be discernible, or frequency of residual sound S−AS' (or S+AS) or S−UAP' (or S+UAP) would be too high to be discernible.

Figure 2:
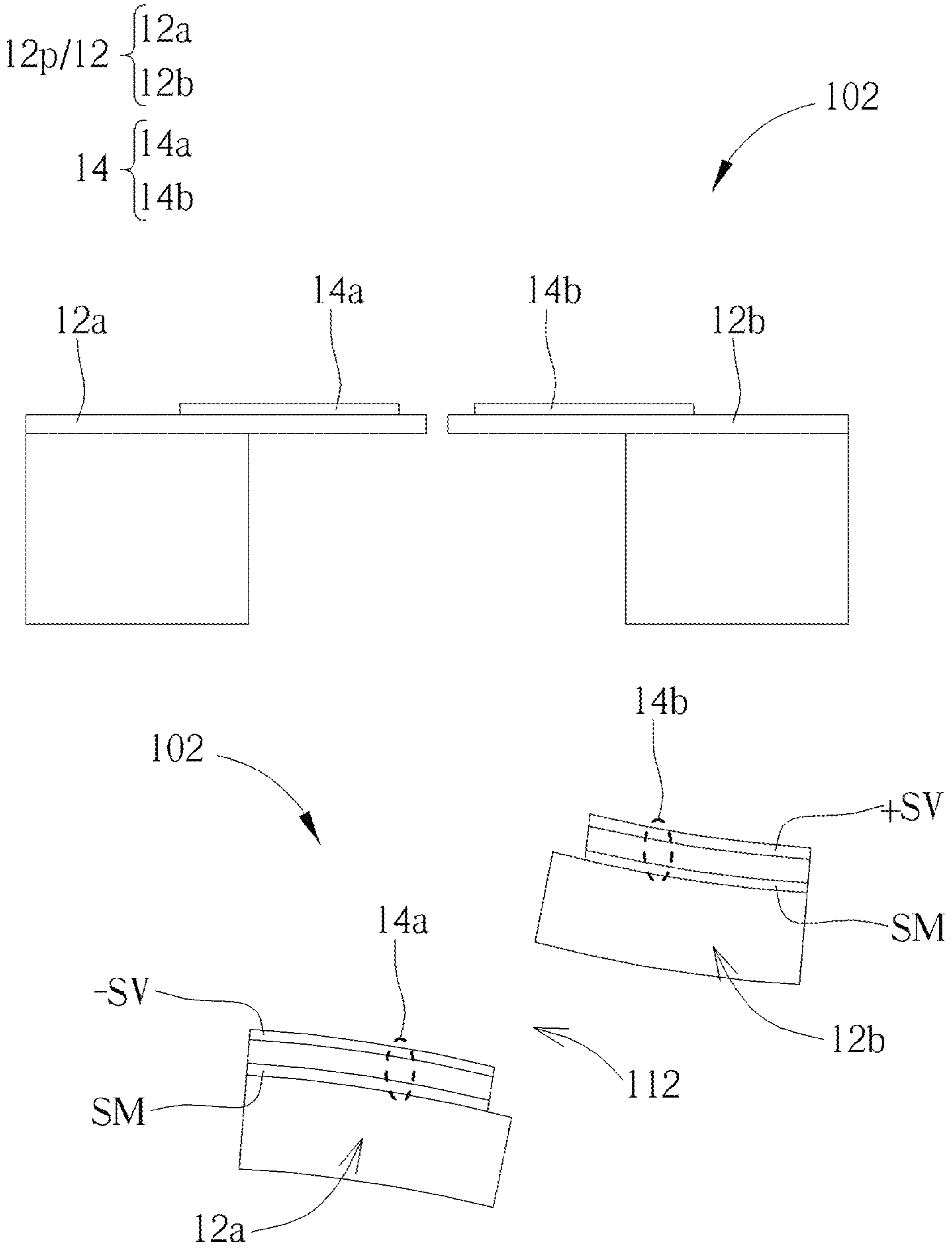
FIG. 2 is a schematic diagram of an air-pulse generating device according to an embodiment of the present application.

According to Ser. No. 18/321,759, FIG. 2 illustrates a schematic diagram of the APG device according to an embodiment of present application. In the present application the APG device is also denoted as 102. As shown in (top portion of) FIG. 2, the APG device 102 comprises a film structure 12. As taught in Ser. No. 18/321,759, the film structure 12 is configured to perform a modulation operation to produce an ultrasonic acoustic/air wave UAW according to an audible sound signal ASS and configured to perform a demodulation operation to produce an ultrasonic pulse array UPA according to the ultrasonic acoustic/air wave UAW. The modulation operation is performed via a common-mode movement of the film structure 12 and the demodulation operation is performed via a differential-mode movement of the film structure 12. After an inherent low pass filtering effect of natural/physical environment and human hearing system, a sound corresponding to the audible sound signal ASS is reproduced.

The film structure 12 comprises a flap pair **12*p*. The flap pair 12*p* is actuated to perform the common-mode movement to perform the modulation operation, which is to produce the ultrasonic acoustic/air wave UAW. Meanwhile, the flap pair 12*p*** is also actuated to perform the differential-mode movement (or differential movement for brevity) to perform the demodulation operation, which is to produce the ultrasonic pulse array UPA, with the ultrasonic pulse rate (e.g., 72 KHz, 128 KHz or 192 KHz), according to the ultrasonic acoustic/air wave UAW.

The flap pair **12*p* comprises a first flap 12*a* and a second flap 12*b* disposed opposite to each other. The flap pair 12*p* is actuated to perform the differential-mode movement to form an opening 112** at an opening rate which is (synchronous with) the ultrasonic pulse rate.

Furthermore, the APG device 102 comprises a first actuator 14*a* and a second actuator 14*b*. The actuator 14*a*/14*b* is disposed on the flap 12*a*/12*b*. Each of the actuators 14*a* and 14*b* comprises a top electrode and a bottom electrode. The top and bottom electrodes receive a modulation signal SM and a demodulation signal +SV or −SV. In the embodiment shown in bottom portion of FIG. 2, the top electrodes of the actuators 14*a* and 14*b* receives the demodulation signal −SV and +SV, respectively, and the bottom electrodes of the actuators 14*a* and 14*b* receives the (common) modulation signal SM. Bias voltage $V_{BIAS}$ is omitted herein for brevity. The demodulation signals +SV and −SV are applied to the actuator 14*a* and 14*b*, such that the flap pair 12*p* performs a differential movement to form the opening 112. Please refer to Ser. No. 18/321,759 to see details of the operation principle of the APG device 102, which are not narrated herein for brevity.

In an embodiment, the plurality of ultrasonic air pulses or the ultrasonic pulse array UPA forming the anti-sound AS may propagate toward an open field, where reflection of the ultrasonic air pulses is negligible at the ANT 10. In an embodiment, a front side (the side where the air pulses emit) of the APG device 102 faces an ambient of a hosting device of the APG device 102. In an embodiment, the front side of the APG device 102 is disposed toward an ambient of the hosting device within which the APG device 102 is disposed.

As mentioned earlier, in an embodiment, APG device 102 may produce 78±2 dB SPL over 10 Hz~20 KHz (almost covering entire audible band) with compact size, which is suitable for noise/sound suppression over broad audible band.

Furthermore, phase produced by SPD/APG 102 is related to pulse rate/cycle and propagation latency from SPD to SSD, independent of various sound frequency. In other words, phase produced by SPD/APG 102 is quite consistent. Hence, SPD/APG 102 is even more suitable, compared to conventional speaker such as DD (dynamic driver), for noise/sound suppression.

Refer back to FIG. 1, the SSD 101 and the APG device 102 may be coupled to a controller 16, via wireline or wireless link such as Bluetooth. The controller 16 is configured to receive a sound signal SS from the SSD 101 and generate a control signal CS for the APG device 102 to produce the plurality of air pulses at the ultrasonic pulse rate which forms the anti-sound AS. In an embodiment, the control signal CS may comprise, be or be used to generate the (de)modulation signals SM, ±SV.

Figure 3:
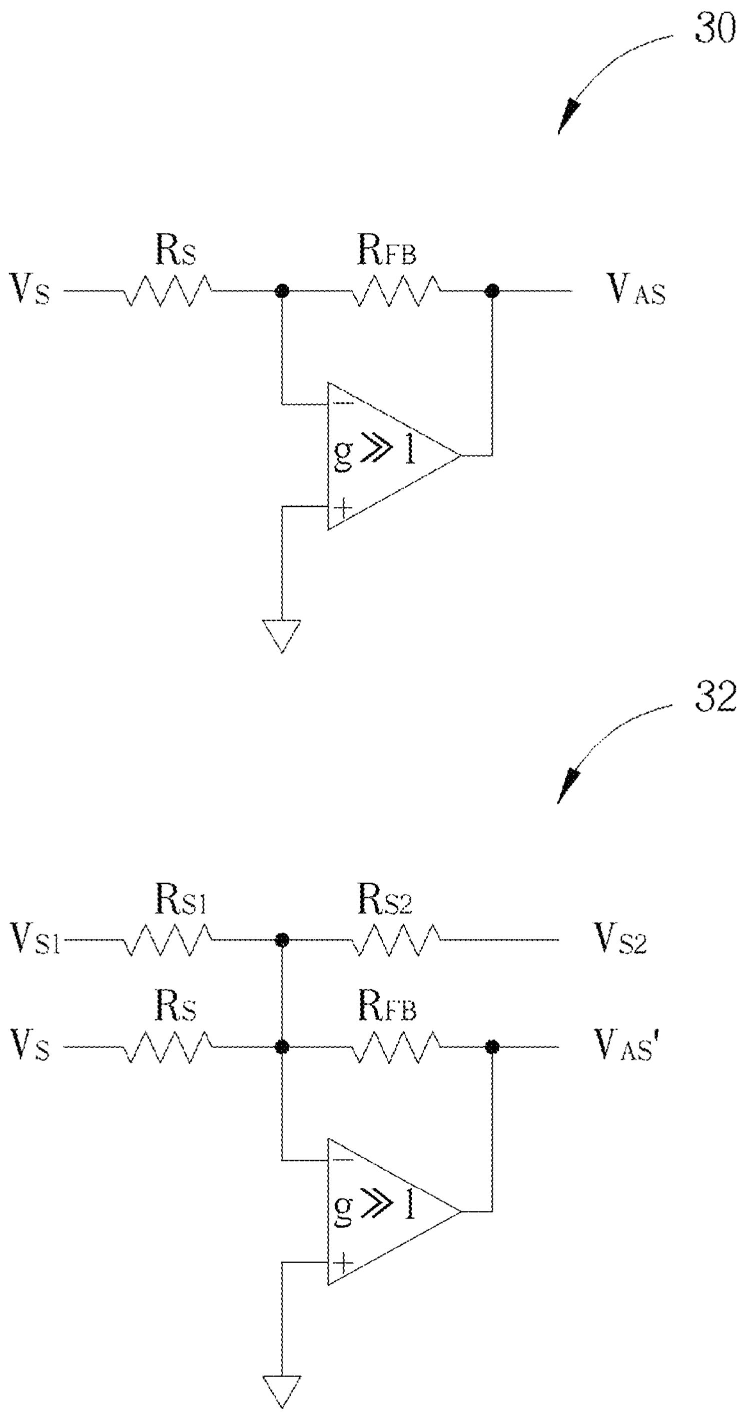
FIG. 3 illustrates a schematic diagram of a controller coupled to a sound suppression apparatus of the present application.

The operation of ANT 10 or controller 16 may be likened/analogous to that of a negative feedback OP amp circuit (operational amplifier), such as a system 30 shown in FIG. 3, where $V_S$ corresponds to the incident sound pressure sensed by the SSD 101 and $V_{AS}$ corresponds to the anti-sound sound pressure generated by the sound generator 102. $V_S$ is corresponding/related to the sound signal SS and $V_{AS}$ may be corresponding/related to the control signal CS. For an ideal OP, with a large open loop gain g (e.g., g>>1,000) and phase stays close to 0° over 1 MHz, then (according to virtual ground/short principle of OP amp) a voltage at negative input terminal of OP amp, denoted as V−, would approach 0, i.e., V−~0 and $V_{AS}$ would conceptually approach negative of $V_S$, i.e., $V_{AS} \approx -V_S$. Hence, anti-sound AS would suppress/cancel undesirable sound S or N (by neglecting sensitivity of SSD 101 and amplifying gain of SPD 102), and system 30 will handle sound wave of frequencies well above the 20 KHz upper bound of human audible frequency.

System 30 is configured for purely suppressing the undesirable noise/sound, which can be extended to incorporate desirable sound. Please refer to system 32 shown in FIG. 3. In addition to system 30, where $S/V_S$ represents undesirable sound/signal, system 32 incorporates desirable signals $V_{S1}$ and $V_{S2}$. $V_{AS}'$, which may be regarded as output of the controller 16 or input of the APG device 102, may be represent as $V'_{AS} = -R_{FB} \times (V_S/R_S + V_{S1}/R_{S1} + V_{S2}/R_{S2})$.

Of course, system 32 may be easily modified to incorporate more desirable signals, and $V_{AS}'$ may be expressed as $V'_{AS} = -R_{FB} \times (V_S/R_S + V_{S1}/R_{S1} + \ldots + V_{Sn}/R_{Sn})$. It means, when the loop gain of system 32 is set high, the acoustic output produced by SPD 102 will contain not only sound component of −S (which is configured to suppress undesirable sound/noise), but also $-(k_1 \cdot S1, \ldots, -k_n \cdot S_n)$, where $k_n$ may be (or be corresponding to) $R_{FB}/R_{Sn}$, and S1, . . . , Sn represent desirable sounds. Note that, the controller 16 may or may not comprises the OP amp shown in FIG. 3.

Figure 4:
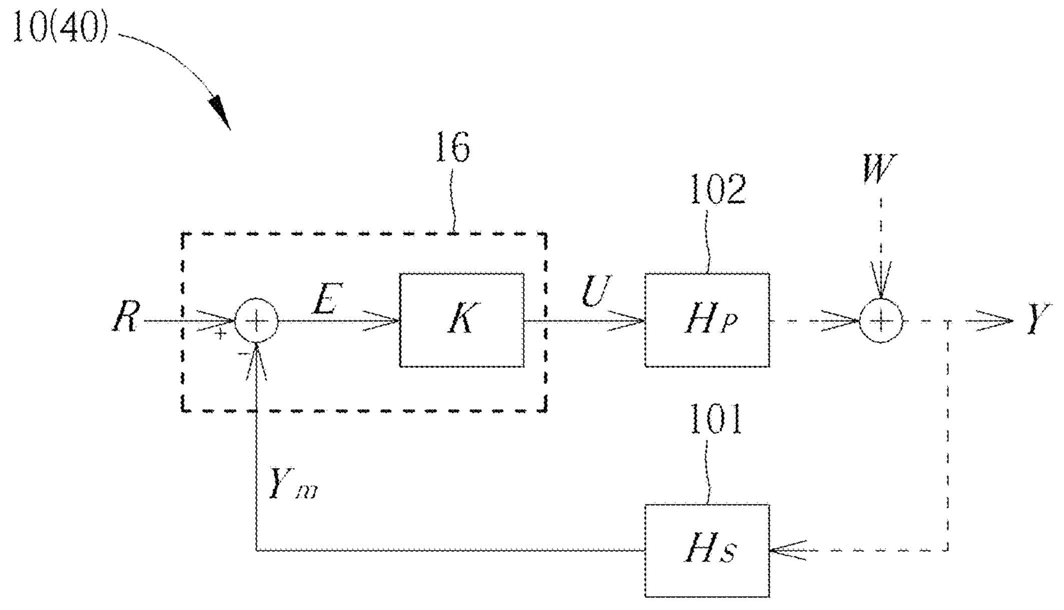
FIG. 4 illustrates a feedback control loop of an embodiment of the present application.

In another perspective/embodiment, operation of the ANT 10 may be viewed as a feedback control loop. FIG. 4 illustrates a system (or feedback control loop) 40 formed by the ANT 10 and the controller 16, according to an embodiment of the present application. In FIG. 4, solid lines/arrows represent electrical path while dash lines/arrows represent acoustic path. K represents a transfer function of a controlling block within the controller 16. $H_P$ represents a transfer function of SPD 102 (plus acoustic channel from SPD 102 and SSD 101). $H_S$ represents a transfer function of SSD 101. W represents acoustic disturbance or unwanted acoustic sound. Y represents acoustic system output of system 40 or ANT 10, which would be heard by user. R represents desired signal to-be-heard, analogous to an integration of $V_{S1}, \ldots, V_{Sn}$ in FIG. 3. $Y_m$ represents measured/microphone output, corresponding/analogous to $V_S$ in FIG. 3 or SS in FIG. 1. E represents an error signal between R and $Y_m$. I/represents controller output, corresponding/analogous to $V_{AS}$ in FIG. 3 or CS in FIG. 1.

As a feedback control loop, system output Y can be expressed as $Y = T \cdot R + S \cdot W$. S can be regarded as sensitivity function or noise transfer function of the feedback control loop 40, representing a degree of suppression of W being suppressed, which can be expressed as $S = 1/(1 + H_P \cdot K \cdot H_S)$. T can be regarded as closed loop transfer function or signal transfer function of the feedback control loop 40, representing a degree of transmission/transparence of R being perceived from Y, which can be expressed as $T = H_P \cdot K/(1 + H_P \cdot K \cdot H_S)$. Within band of interest (e.g. audible band or spectrum band below 20 KHz), K is designed such that $T \rightarrow 1$ and $S \ll 1$.

The ANT 10 may be disposed/assembled within a wearable sound device, e.g., earbud or headphone, to create a local quiet zone or POS. Herein, the controller 16 may or may not be disposed within the wearable sound device. In an embodiment, controller 16 may be disposed within an electronic device which has a wireless connection with the wearable sound device where ANT 10 is disposed therewithin.

Figure 5:
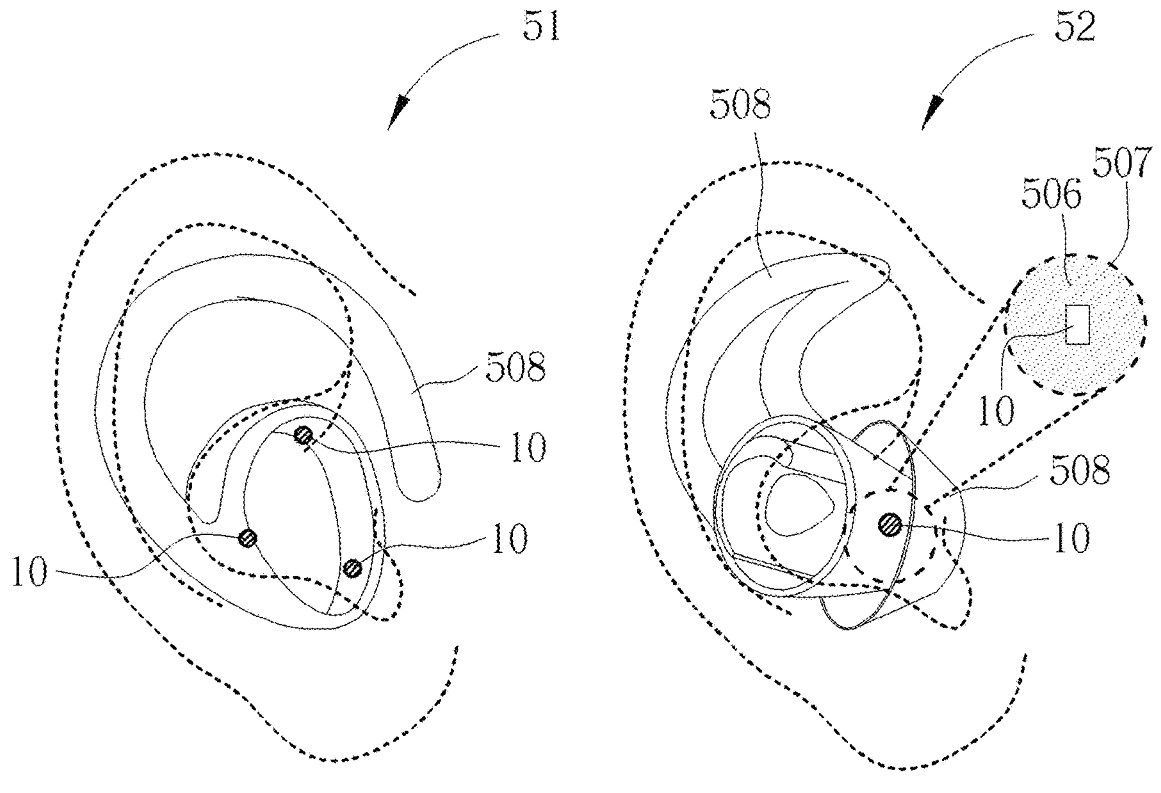
FIG. 5 illustrates a schematic diagram of a sound suppression apparatus disposed within a wearable sound device according to an embodiment of the present application.
Figure 6:
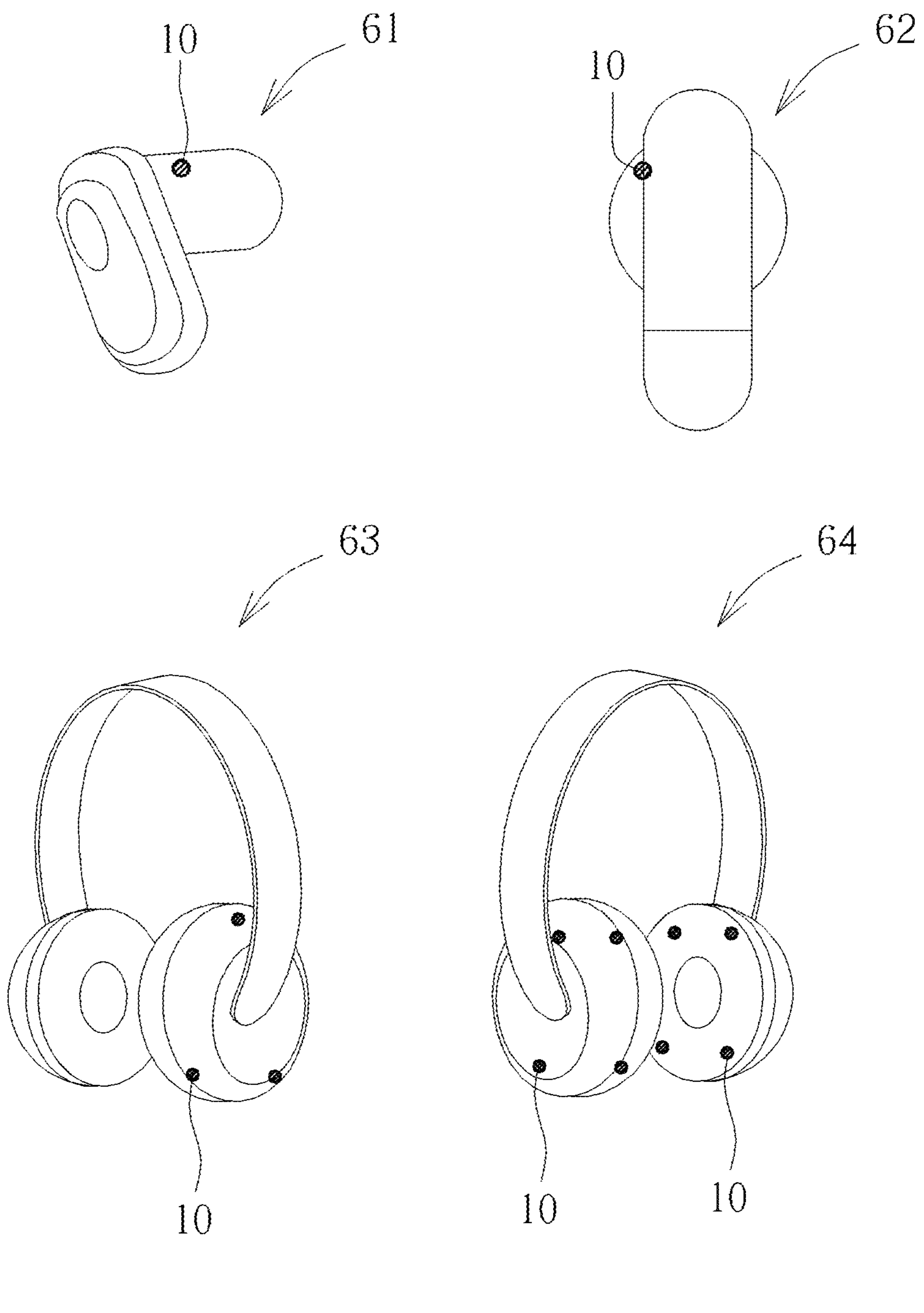
FIG. 6 illustrates a schematic diagram of a sound suppression apparatus disposed within a wearable sound device according to an embodiment of the present application.

Refer to FIG. 5 and FIG. 6 of this type of application. Under this application scenario, the ability of each individual ANT to create a local POS through anti-sound is utilized to create local POS within a radius of $r = \lambda/2\pi$ for sound of wavelength λ. For example, in configuration of 52 in FIG. 5, where ANT 10 is placed at the exterior orifice of or outside the ear canal which is semi-oval shape with diameter of 8~10 mm for adults. A holder 508 of the wearable sound device, which may be made of material such as silicon or any suitable material, may hold ANT 10 near/at the center of the entrance to the ear canal, as illustrated by 506, 507, where 507 represents a cross section of an ear canal, and 506 represents a passageway within the ear canal. An effective upper bound frequency of POS, which ANT 10 in FIG. 5 creates, can be estimated as $346/(4.5\times10^{-3}\times2\pi)=12.24$ KHz (by assuming radius of exterior orifice of ear canal is 4.5 mm), which is enough to suppress most ambient noise.

Furthermore, assume the dimension of ANT is $2.5\times4.6\times8$ $mm^3$ as an embodiment, then the percentage of area of ear canal 506/507 blocked by ANT 10 is substantially $(2.5\times4.6)/(4.5^2\times2\pi)\sim18\%$, which means, with good design of holder 308, up to 80% of the ear canal passageway 306 can be opened up which will allow airflow to go in and out of ear canal, and help avoid causing any discomfort over extended wear, such as 8+ hours of sleep.

Combining these two features (POS whose effective frequency up to 12 KHz; minimal/no discomfort) with appropriate ambient control, ANT 10 may be disposed within the device 52 with nighttime ambient noise control. The device 52 may also be applied for any occasions where one seeks quiet and restful privacy with minimal/no discomfort over extended wear.

For safety concern, the controller 16 may be optimized for the intended virtual quiet zone application. For example, the controller 16 within ANT 10 may manually or automatically enter an "ambient passthrough" mode, such that ambient sound may be heard by user. The ambient passthrough mode may be realized by adjusting $R_S$ in system 30/32, adjusting sensitivity S of the close loop feedback control system 40, or (partially) including ambient sound in desirable signal R shown in FIG. 4. In an embodiment, the ANT 10 may sense (ambient) buzzer or alarming sound and automatically enter the ambient passthrough mode. Extra control signal(s) may be added, to allow personal electronic device such as smart phone/watch to perform, possibly via wireless or BT, emergency notification or device tuning with AI (artificial intelligence).

As shown in FIG. 6, ANT 10 creating localized POS or small quiet-zone may be applied in all kinds of earbuds (e.g., 61, 62) and headsets (e.g., 63, 64). Note that, different from conventional ANC (active noise cancellation) techniques in audio applications, sound suppression/cancelation is performed in open field. In FIG. 5 or FIG. 6, one or more ANTs 10 will be creating a "virtual quiet zone" near the entrance to the ear canal, such as in the vicinity of the ear-tips, such that most ambient noises will be annihilated by the anti-sound generated by ANT/APG before they (the ambient noises) have a chance entering the ear canal.

Note that, location of ANT on the wearable sound device is not limited, which may be optimized according to practical requirements.

In other word, different from conventional ANC which produces anti-sound inside the ear canal, ANT 10 generates anti-sound via its own speaker 102 located outside of the ear canal and ANT 10 performs sound suppression/cancelation in the open field. Since SPD 102 is disposed outside the ear canal, the anti-sound generated by SPD 102 will annihilate ambient soundwave which results in, ideally, net-0 residual soundwave of ambient noise entering the ear canal. That is, via creating a local pocket of silence through generating anti-sound, the ambient noise is annihilated before they (the ambient noise) reach the ear-tip of the earbud and therefore avoid the need to cancel the noise after the noise entered the ear canal. In addition, ANT 10 operates in the open-field, before the ambient sound goes through passive isolation, gets muddied-up and polluted by resonance within the ear canal.

Referring back to FIG. 1, the controller 16 may optionally comprise a filter 167, but not limited thereto. In an embodiment, the filter 167 may be configured to adjust a frequency response of control signal CS so as to customize the effective frequency range of anti-sound produced by ANT 10. For example, the filter 167 may impose low-pass filtering or band-rejection (notch filtering) on the anti-sound.

Figure 7:
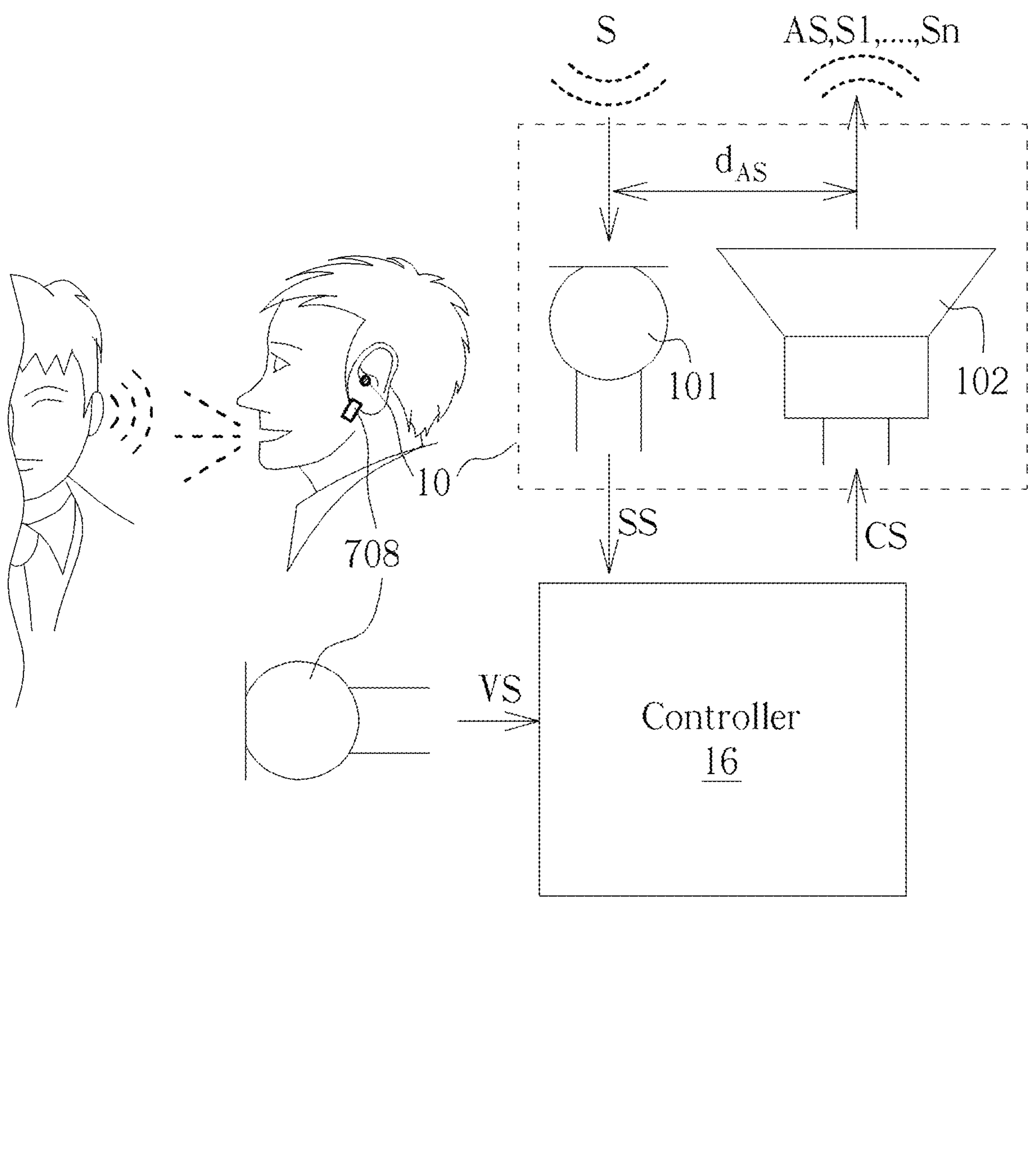
FIG. 7 illustrates a schematic diagram of a sound suppression apparatus disposed within a wearable sound device according to an embodiment of the present application.

In an embodiment, controller 16 may be coupled to an SSD 708, as illustrated in FIG. 7. In FIG. 7, as ANT 10 is mounted/placed on ear, SSD 708 may be mounted to face mouth of user, which may be used to capture/sense voice. Voice signal VS sensed by SSD 708, corresponding/analogous to $V_{S1}$ in FIG. 3 (where $V_{S2}$ in FIG. 3 may be corresponding to music file to be played, as an example), may be delivered to controller 16 so that SPD 102 may produce sound corresponding to voice signal VS, which may be (part of) ambient pass-through sound/signal to be heard.

Figure 8:
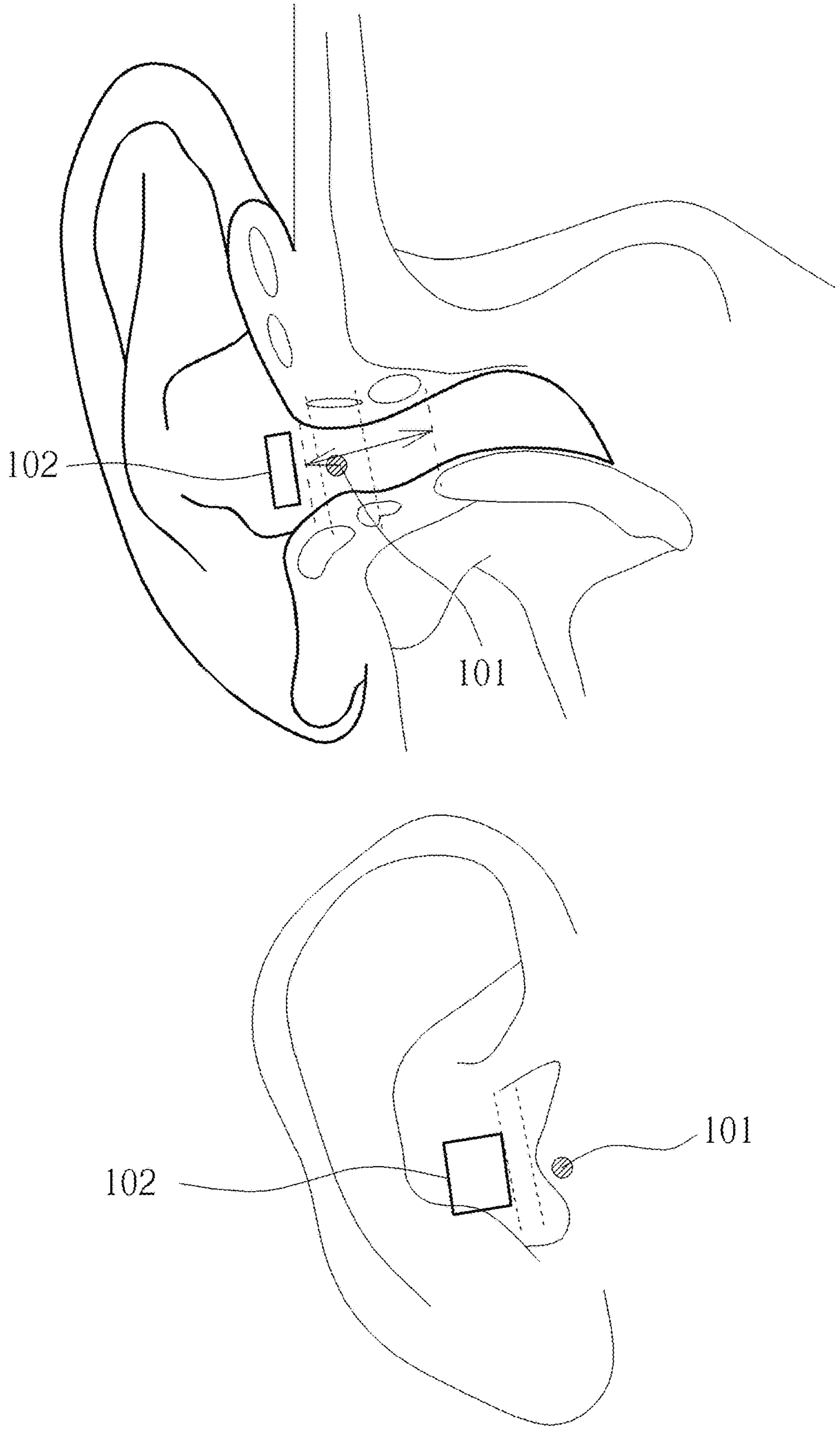
FIG. 8 illustrates a schematic diagram of a sound sensing device and a sound producing device mounted around ear canal according to an embodiment of the present application.

Placement of SSD 101 and SPD 102 is not limited. In an embodiment, ANT 10 may be disposed on/within the wearable sound device (e.g., an OWS (open wearable stereo) earbud) such that SPD 102 is placed outside the ear canal while SSD 101 is placed inside the ear canal, shown in FIG. 8. In this case, the user may experience acoustically transparent (of ambient) and free of occlusion, which enhance user experience.

Since diameter of ear canal (typically 5~6 mm) would be much less than wavelength of audible sound, audible sound wave after propagating into the ear canal may be viewed as (or forced to be) planar wave, even it is spherically acoustic wave before entering into ear canal. Placing the SSD 101 inside the ear canal may bypass/reduce the effect of 1/r propagation attenuating of (spherically) acoustic wave produced by SPD 102 and be able to capture sound/noise accurately.

In an embodiment, (a sensing hole of) SSD 101 may be placed within the ear canal to have a distance (from the outer ear to ear canal transition plane) into the ear canal. The distance may be $(1/3)\times\varphi_{ear\text{-}canal}\sim1\times\varphi_{ear\text{-}canal}$, where $\varphi_{ear\text{-}canal}$ represent a diameter of ear canal. Assuming $\varphi_{ear\text{-}canal}$ is 12 mm, in an embodiment, (the sensing hole of) SSD 101 may be (substantially) 2~6 mm into ear canal.

When the ANT 10 is disposed in wearable sound device such as an OWS earbud, the SPD/APG 102 may perform not only noise-suppression operation, suppressing unwanted sound such as noise, but also sound-producing operation, producing wanted sound such as music. Note that, the ANT 10 embedded within OWS earbud would achieve a near "fully open" or "complete ambient pass through" mode when the noise-suppression operation of ANT 10 or SPD 102 is turned off (while the sound-producing operation may remain functioning). In other words, an ultimate ambient pass through mode may achieved by simply pausing the operation of noise-suppression.

The effective bandwidth of noise-suppression is related to a distance between SSD 101 and SPD 102, denoted as $d_{AS}$. The higher effective bandwidth, the smaller the distance $d_{AS}$ is required. In an embodiment, the distance $d_{AS}$ may be less than a wavelength corresponding to a maximum frequency of noise desired to be suppressed. For example, the distance das may be less than 5.77 mm, which is the wavelength corresponding to (maximum frequency of noise desired to be suppressed being) 20 KHz, but not limited thereto. The maximum frequency of noise desired to be suppressed may be 7 KHz (covering most of the human voice band), where $d_{AS}$ may be less than 50 mm, or 16 KHz (covering the upper limit of audible frequency for most adults over 35 of age), where das may be less than 22 mm.

Note that, a frequency f (related to the effective bandwidth) can be expressed as $$f = \frac{180° - \phi_{101} - \phi_{PM}}{360°} \times \frac{1}{\tau_{102} + \tau_{AS}},$$

where $\phi_{101}$ represents phase lag brought by SSD 101, $\phi_{PM}$ represents phase margin which maintains stability, $\tau_{102}$ represents pulse interval/cycle generated by SPD/APG 102 (i.e., $\tau_{102}$ may be $1/f_{pulse}$ where $f_{pulse}$ is the pulse rate, e.g., 200 KHz), and $\tau_{AS}$ represents propagation delay from SPD 102 to SSD 101, where $$\tau_{AS} = \frac{d_{AS}}{c_0}$$

and $c_0$ is sound of speed. In an embodiment, the distance das may be less than a half wavelength or a third wavelength corresponding to a maximum frequency of noise desired to be suppressed, where $\phi_{101}=10°$ and $\phi_{PM}=50°$ may be assumed for deriving the third wavelength.

Referring back to FIG. 4, where SSD 101, SPD 102 and controller 16 form feedback control loop 40, the feedback control loop 40 would have a loop gain L (which may be expressed as $L=H_P \cdot K \cdot H_S$) or an open loop gain $g_{OL}$ (which may be expressed as $g_{OL}=H_P \cdot K$). Generally, (within band of interest or spectrum band where $H_S \rightarrow 1$) residual error would decrease as loop gain increases.

In an embodiment, the loop gain $g_{OL}$/L may be (automatically) adjusted high in a noisy environment and adjusted low in a quiet environment.

That is, the loop gain $g_{OL}$/L may be increased when a surrounding/environmental SPL is large or increasing, and vice versa. The surrounding/environmental SPL may be measured by an SSD, which may or may not be SSD 101.

In other words, the controller 16 may perform an adaptive gain control (AGC) operation. The controller 16 may receive an environmental SPL and adjust the loop gain $g_{OL}$/L corresponding to the feedback control loop 40 according to the environmental SPL. In an embodiment, the larger the environmental SPL is, the higher the loop gain $g_{OL}$/L is adjusted. Or, equivalently, the controller 16 may lower the loop gain $g_{OL}$/L when the environmental SPL is lower.

Figure 9:
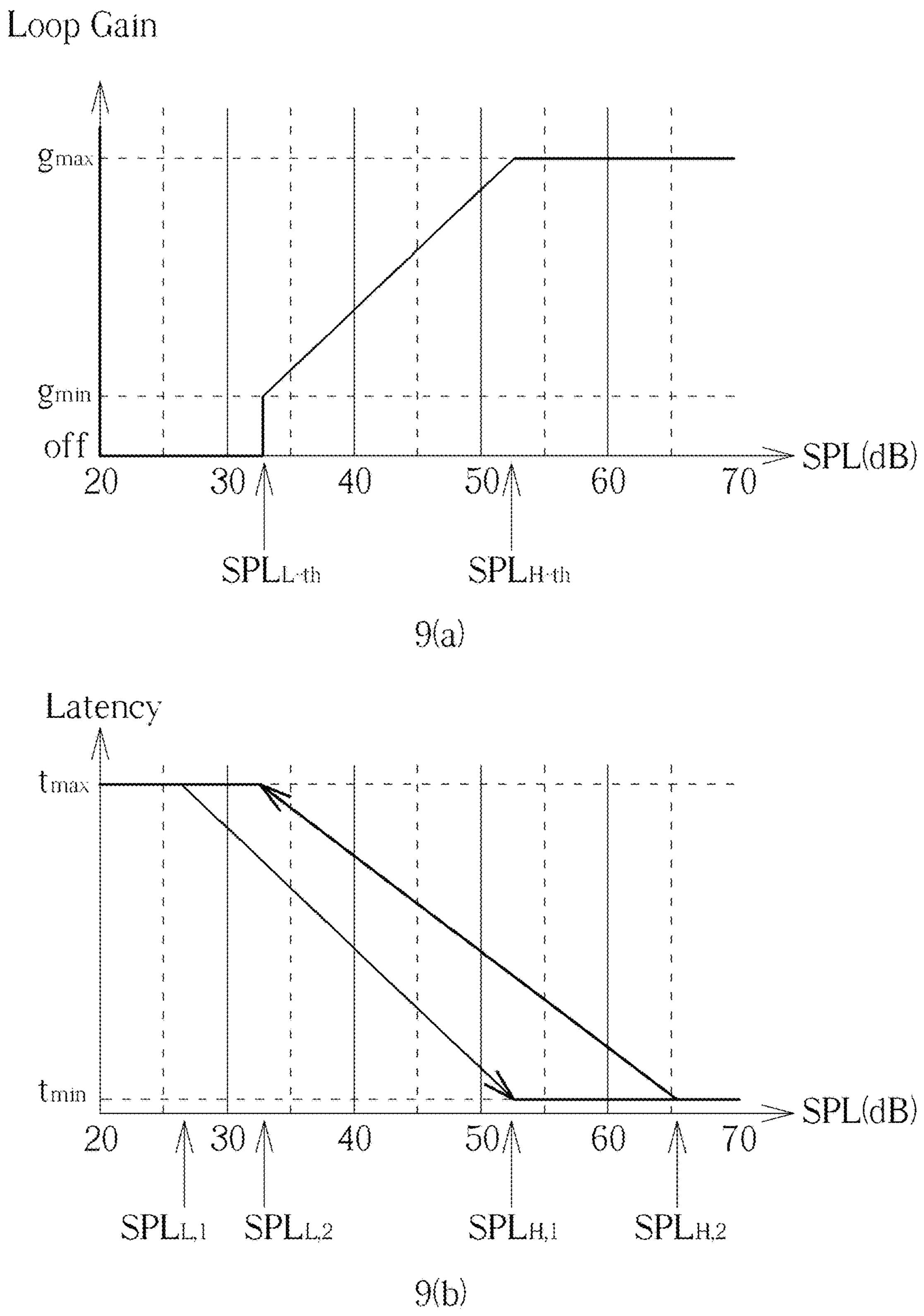
FIG. 9 illustrates a schematic diagram of loop gain adjustment and latency adjustment according to an embodiment of the present application.

The AGC adjustment scheme may be illustrated as FIG. 9(*a*). As shown in FIG. 9(*a*), when the environmental SPL is between thresholds $SPL_{L\text{-}th}$ and $SPL_{H\text{-}th}$, the loop gain may be increased as the environmental SPL increases. The loop gain may be set as $g_{max}$ when the environmental SPL is larger than $SPL_{H\text{-}th}$, and set as $g_{min}$ when the environmental SPL is less than $SPL_{L\text{-}th}$. In an embodiment, the sound suppression may be turned off when the environmental SPL is less than some SPL threshold (e.g., $SPL_{L\text{-}th}$). In other words, some amplifying circuit (especially the one involving the loop gain $g_{OL}$/L) within the controller 16 or even SPD 102 may be turned off, so as to lower/minimize power consumption.

In an embodiment, $SPL_{L\text{-}th}$ may be 33 dB, 3 dB above 30 dB, which corresponds to an SPL level of whisper in the ear; $SPL_{H\text{-}th}$ may be 52 dB, 2 dB above 50 dB, which corresponds to an SPL level of soft conversation, which is not limited thereto.

In addition, an important goal of AGC adjusting loop gain is to keep the residual noise level below a threshold which is proper for the intended application. For example, the threshold may be 35~45 dB for sleeping, 50~55 dB for awake activity, 60~65 dB for adequate ambient awareness, but not limited thereto.

In addition, the controller 16 may impose a latency $t_{adj}$ within the feedback control loop 40. The adjustable latency $t_{adj}$ may comprise a response time of AGC adjustment. In general, the controller 16 may adjust the latency $t_{adj}$ so that the AGC responses faster (with small $t_{adj}$) in noisy environment and responses slower (with large $t_{adj}$) in quiet environment. In other words, the controller 16 may adjust the latency $t_{adj}$ according to the environmental SPL. In an embodiment, the larger the environmental SPL is, the lower the latency $t_{adj}$ is adjusted.

Furthermore, in an embodiment, AGC adjustment may response faster when the surrounding environment is noisier or getting noisier, compared to the scenario of the surrounding environment being (getting) quieter.

For example, FIG. 9(*b*) illustrates a latency adjusting scheme according to an embodiment of present application. The controller 16 may control the time latency $t_{adj}$ to decrease when the environmental SPL (which may be sensed by SSD 101) is more than $SPL_{L,1}$ and less than $SPL_{H,1}$, and control the time latency $t_{adj}$ to increase when the environmental SPL (which may be sensed by SSD 101) is less than $SPL_{H,2}$ and more than $SPL_{L,2}$. In an embodiment, an optional hysteresis of latency adjustment may be included, which means $SPL_{H,2}>SPL_{H,1}$ and $SPL_{L,2}>SPL_{L,1}$. The hysteresis may be capable of preventing the raising-and-lowering oscillation of loop gain adjustment, which may stabilize the loop operation of ANT 10. In an embodiment, ($SPL_{L,1}$, $SPL_{L,2}$, $SPL_{H,1}$, $SPL_{H,2}$) may be (27 dB, 33 dB, 52 dB, 65 dB), which may be designed according to practical requirements and not limited thereto. In an embodiment, values for FIG. 9 may be chosen as 1~10 dB for $g_{min}$, 30~600 dB for $g_{max}$, 10~100 μS (micro-second) for $t_{min}$ and 1~200 mS (milli-second) for $t_{max}$, but not limited thereto.

Note that, SPL herein serves a measurement of acoustic quantity of environment (as an example), which is not limited thereto. Any kind of acoustic measurement can be applied to AGC or latency adjustment stated in the above.

Furthermore, concept of establishing quiet zone or POS may be expanded to achieving acoustic isolation or acoustic reflection, via a plurality/plenty of sound suppression apparatuses, which may be arranged under certain pattern or regularity.

Figure 10:
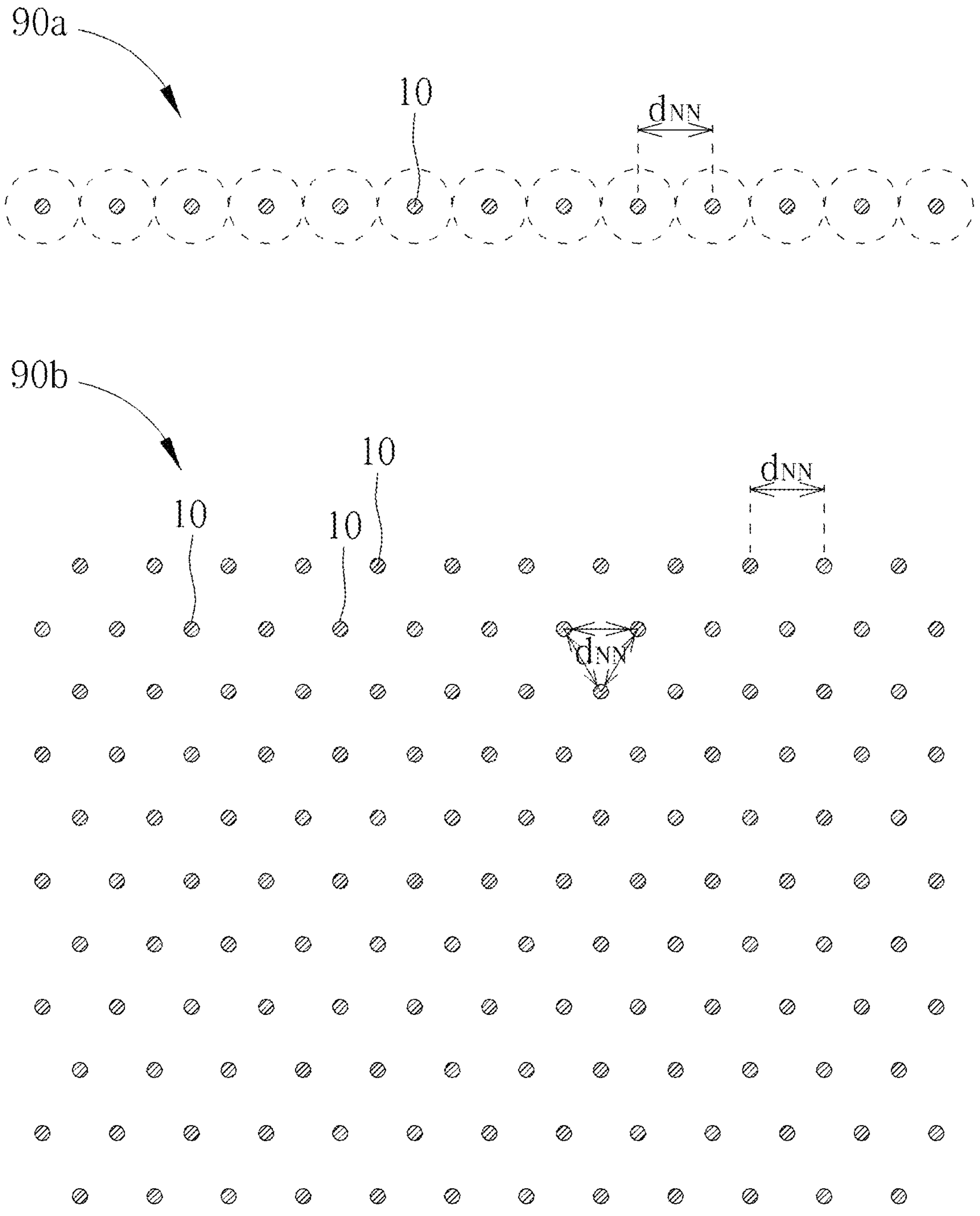
FIG. 10 is a schematic diagram of a sound suppression system according to an embodiment of the present application.

FIG. 10 illustrates schematic diagram of sound suppression systems 90*a* and 90*b* according to embodiments. Sound suppression system 90*a*/90*b* comprises a plurality of sound suppression apparatuses (e.g., sound suppression apparatus 10 comprising an SSD and an SPD), shown as shaded circles in FIG. 10 and annotated as 10. The plurality of sound suppression apparatuses may be arranged as a one-dimensional array like system 90*a*, or a two-dimensional array like system 90*b*, which is not limited thereto. The sound suppression apparatuses may have an inter-ANT spacing of $d_{NN}$ as shown in FIG. 10. In an embodiment, the sound suppression apparatuses may be arranged in a certain pattern, e.g., an equilateral triangle pattern with inter-ANT spacing $d_{NN}$ like system 90*b*, but not limited thereto.

The plurality of sound suppression apparatuses may also be arranged as a circular array (e.g., disposing on noise intensive machinery, such as an MRI (magnetic resonance imaging) machine or a drone, which may be equally spaced or unequally spaced), or a three-dimensional array. As long as the arrangement of the sound suppression apparatuses can effectively suppress unwanted sound/noise, it is within the scope of present invention as well.

In an embodiment, the plurality of sound suppression apparatuses (within sound suppression system 90*b*) may be physically connected via some connecting structure such as string/cord/rope to form a mesh-like network. The mesh-like sound suppression system may be in a form of curtain or screen, which is highly transmissive to light and/or airflow, e.g., more that 60% transmissive to light and/or airflow. In the present application, being transmissive to light and/or airflow refers to more than 50% transmissive to both light and/or airflow.

Note that, the SPD of the sound suppression apparatus within the sound suppression system is not limited to be the APG device mentioned above. As long as the sound suppression apparatuses are arranged in a certain pattern, e.g., in an array or as a mesh, and provides certain degree of acoustic isolation/reflection, it is within the scope of the present application. Preferably, the SPD of the sound suppression apparatus is suggested to have compact size and be capable of producing sound over full audible bandwidth with substantial SPL, which is suitable for the configuration of the sound suppression apparatus/system. Furthermore, SPD producing/carrying consistent phase would even be beneficial for noise suppression.

Figure 11:
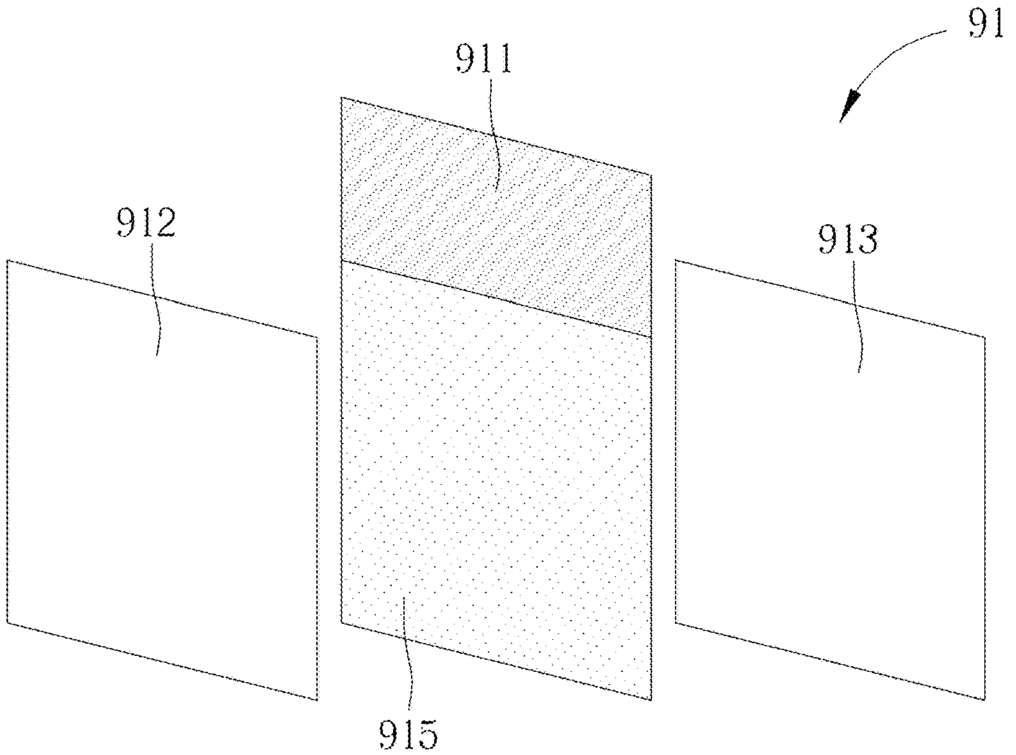
FIG. 11 illustrates a schematic diagram of an embodiment of sound suppression system applied on acoustic screen.

FIG. 11 illustrates a schematic diagram of an embodiment/application 91 of the sound suppression system applied on acoustic (isolation) screen. In the embodiment/application 91, sound suppression system 90*b* is configured to form an acoustic (isolation) screen 911 and 915. Acoustic screen 915 may have lower density of sound suppression apparatuses (which means that inter-ANT space $d_{NN}$ of acoustic screen 915 is larger than which of acoustic screen 911).

Acoustic (isolation) screen 911/915 is configured to suppress sound of one side of screen 911/915, intending to prevent the sound of the one side of screen 911/915 from propagating to another. That is, screen 911/915 is configured to attenuate/suppress a first sound from a first sound source in a first subspace on a first side (e.g., right side) of screen 911/915. The first sound may propagate toward a second subspace of a second side through screen 911/915. After the first sound passing through the screen 911/915, which is transmissive to light and/or airflow, a suppressed first sound would propagate toward the second subspace on the second side (e.g., left side) of the screen 911/915, and an acoustic magnitude of the suppressed first sound would be significantly less than (e.g., 10 dB less than or at least 3 dB less than) an acoustic magnitude of the first sound. Herein acoustic magnitude may refer to SPL, acoustic pressure, acoustic intensity, etc., or acoustic measurement represent strength of acoustic sound.

In the construct 91, curtains 912 and 913 may be further optionally included. Curtains 912 and 913, which may be made of fabric or fabric-like material, may be disposed on first and second sides of the screen 915, provide and assist on sound wave absorption of higher frequency such that intensity of density of sound suppression apparatuses as well as production cost of the screen 915 can be reduced. And the upper screen 911 may have tighter density for extended (high) frequency range of acoustic isolation.

The construct 91 may be used in health care applications, e.g., in ward or clinic to partition room space when privacy is needed. In addition to being replaceable for sanitary and hygiene reason, which is critical in health care application, fabric curtains 912 and 913 may also play the role of sound damping. The existence of sound absorption material in a small chamber would contribute to the comfort.

Figure 12:
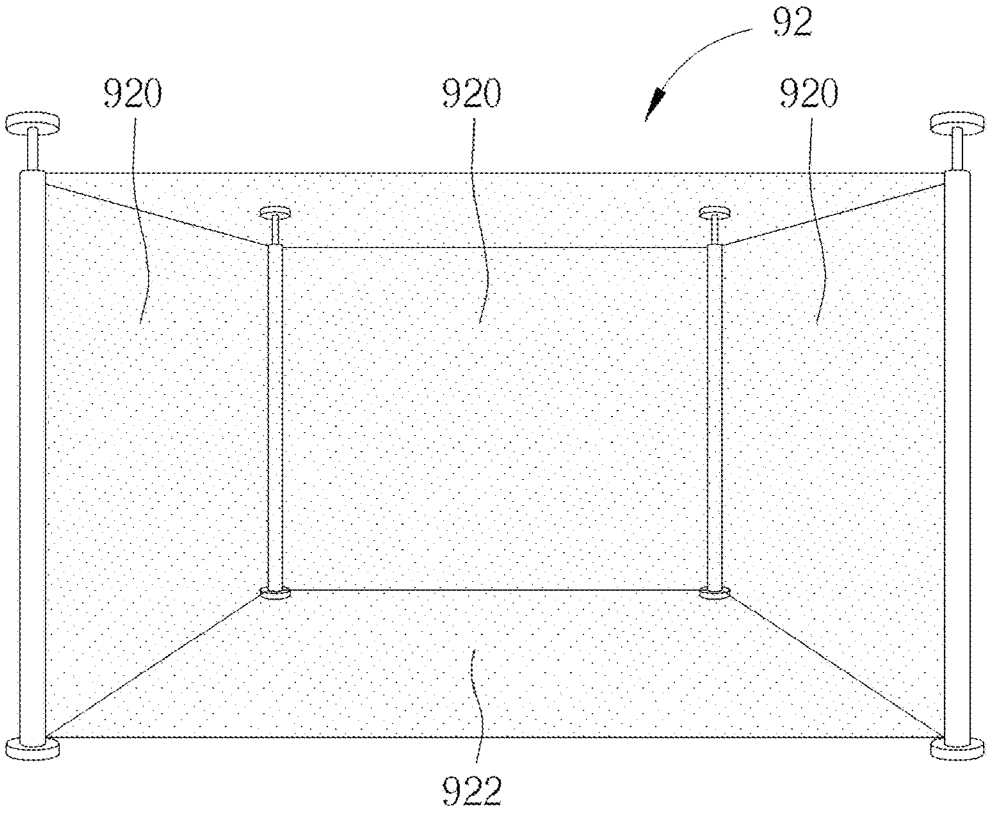
FIG. 12 illustrates a schematic diagram of an embodiment of sound suppression system applied on forming an acoustic isolated space.

FIG. 12 illustrates a schematic diagram of an embodiment/application 92 of the sound suppression system, which may be applied on forming an acoustic isolated space. The sound suppression system(s) 90*b* may be embedded inside acoustic isolation screens 920. The acoustic isolation screens 920, which may be portable, forms/surrounds a space/room 922. The space/room 922 may be acoustically isolated.

The space/room 922 may be established for privacy, which can, e.g., be used as meeting room in office or used for hosting (backyard) party with families/friends. Or, some construction occupying small area but producing loud noise (e.g., partially renovating floor tiles in apartment) can take place within the (nomadic) space/room 922.

Acoustic isolated space or private space in the present application may refer to a space which keeps inside conversation (or other kind of sound inside the space) in and substantially blocks inside conversation (or other kind of sound) from propagating outward. Acoustic isolated space or private space in the present application may also refer to a space which keeps outside noise/sound out, which substantially blocks outside noise/sound from propagating inward.

Figure 13:
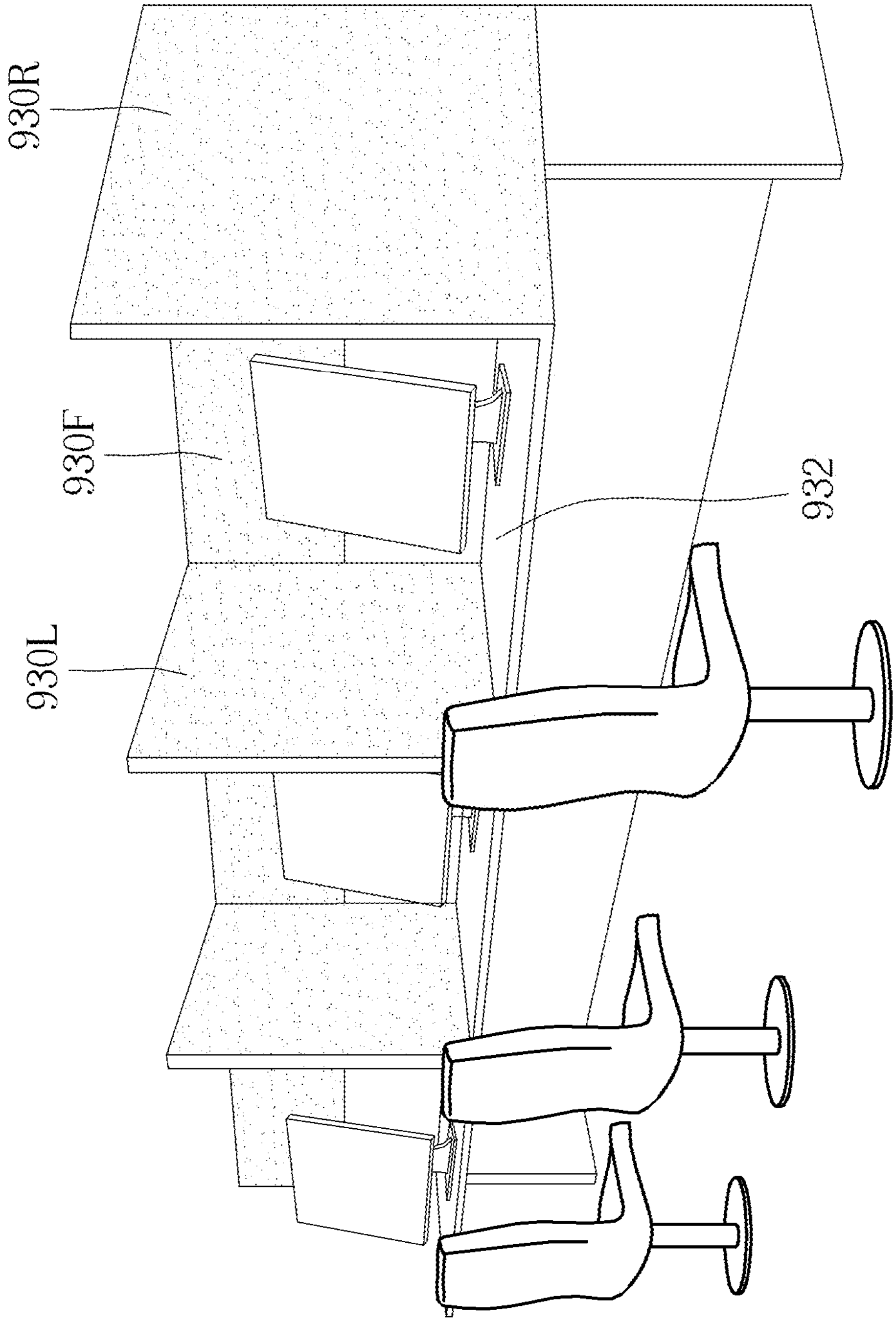
FIG. 13 illustrates a schematic diagram of a scenario of office as an application of sound suppression system according to an embodiment of present invention.

FIG. 13 illustrates a schematic diagram of a scenario of office as an application 93 of sound suppression system according to an embodiment of present invention. Sound suppression system(s) 90*b* may be embedded inside acoustic isolation screens 930L, 930R, 930F, which may be transmissive to airflow and/or light. Acoustic isolation screens 930L, 930R, 930F may be used for/as cubicle partition. Take the cubicle 932 as an example. Cubicle 932 is surrounded by screen 930L on the left, screen 930R on the right and screen 930F in the front. Being highly transmissive to airflow, the ambient atmosphere of the office will still be that of an open office, and free exchange of ideas can occur without hindrance. However, the adoption screens 930L, 930R, 930F will allow private workspace to be created, on the spot, whenever focus and concentrating is required.

Figure 14:
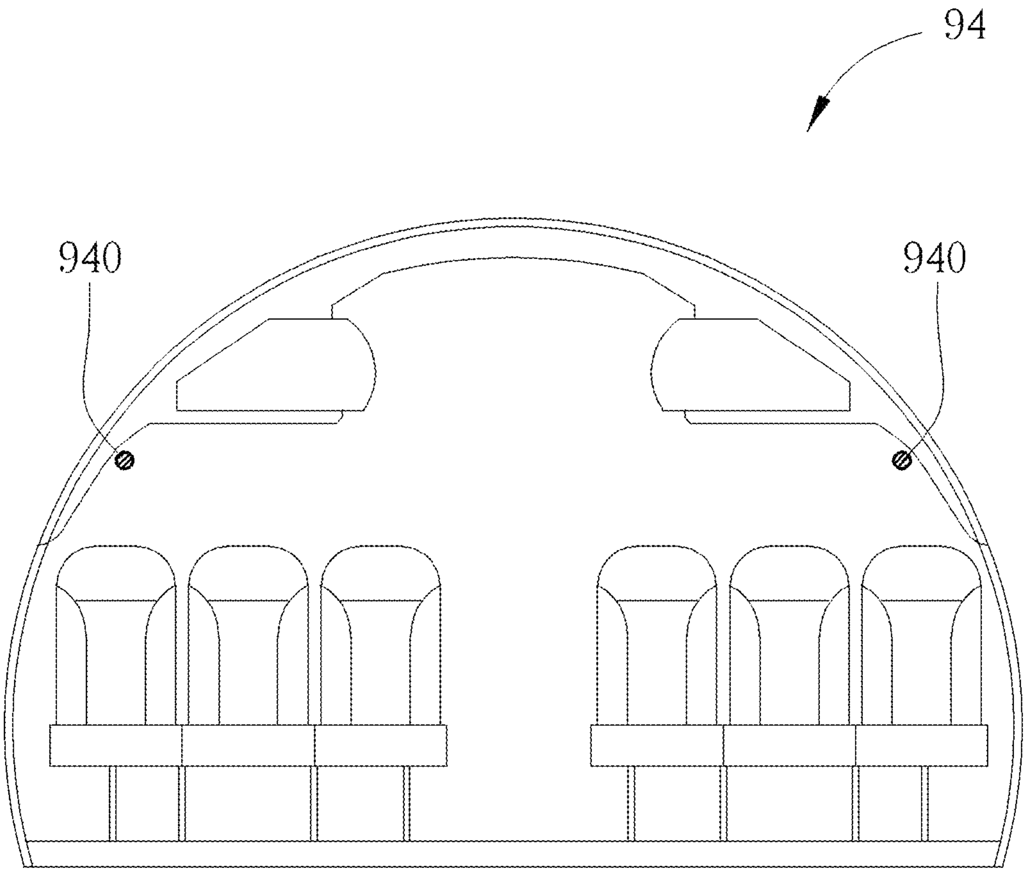
FIG. 14 illustrates a schematic diagram of a scenario of aircraft cabin as an application of sound suppression apparatus/system according to an embodiment of present invention.

FIG. 14 illustrates a schematic diagram of a scenario of aircraft cabin as an application 94 of sound suppression apparatus/system according to an embodiment of present invention. Sound suppression apparatuses 940 may be disposed on sidewalls of the airplane cabin. Note that, noise spectrum within airline cabin may have peak(s) occurring between 40~60 Hz, corresponding to wavelength $\lambda$ of 8.6 m(meter)~5.8 m and half wavelength $\lambda/2$ would fall between 2.9 m to 4.3 m, which matches cabin width as, e.g., 3.63 m. In other words, disposing sound suppression apparatuses on the sidewall(s) of airplane cabin may effectively null out or reduce cabin resonance noise, which enhances passengers' flight experience.

Figure 15:
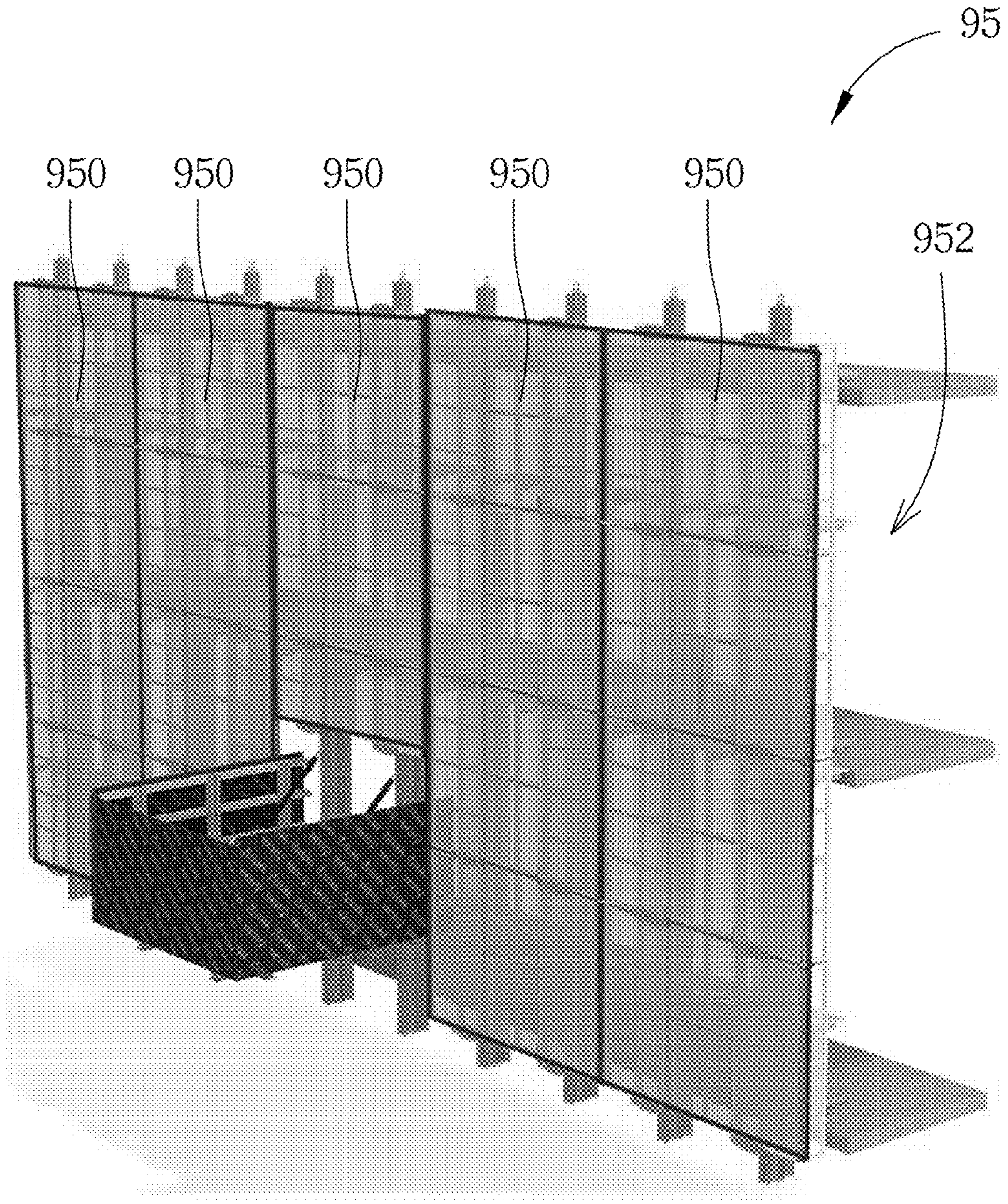
FIG. 15 illustrates a schematic diagram of a scenario of construction side as an application of sound suppression system according to an embodiment of present invention.

FIG. 15 illustrates a schematic diagram of a scenario of construction side as an application 95 of sound suppression system according to an embodiment of present invention. Sound suppression system(s) 90*b* may be embedded inside acoustic isolation screens 950. Construction noise generated within building would be suppressed/isolated by screens 950, and thereby neighborhood of the construction site would rather be quiet, compared to the cases without acoustic isolation screens.

Figure 16:
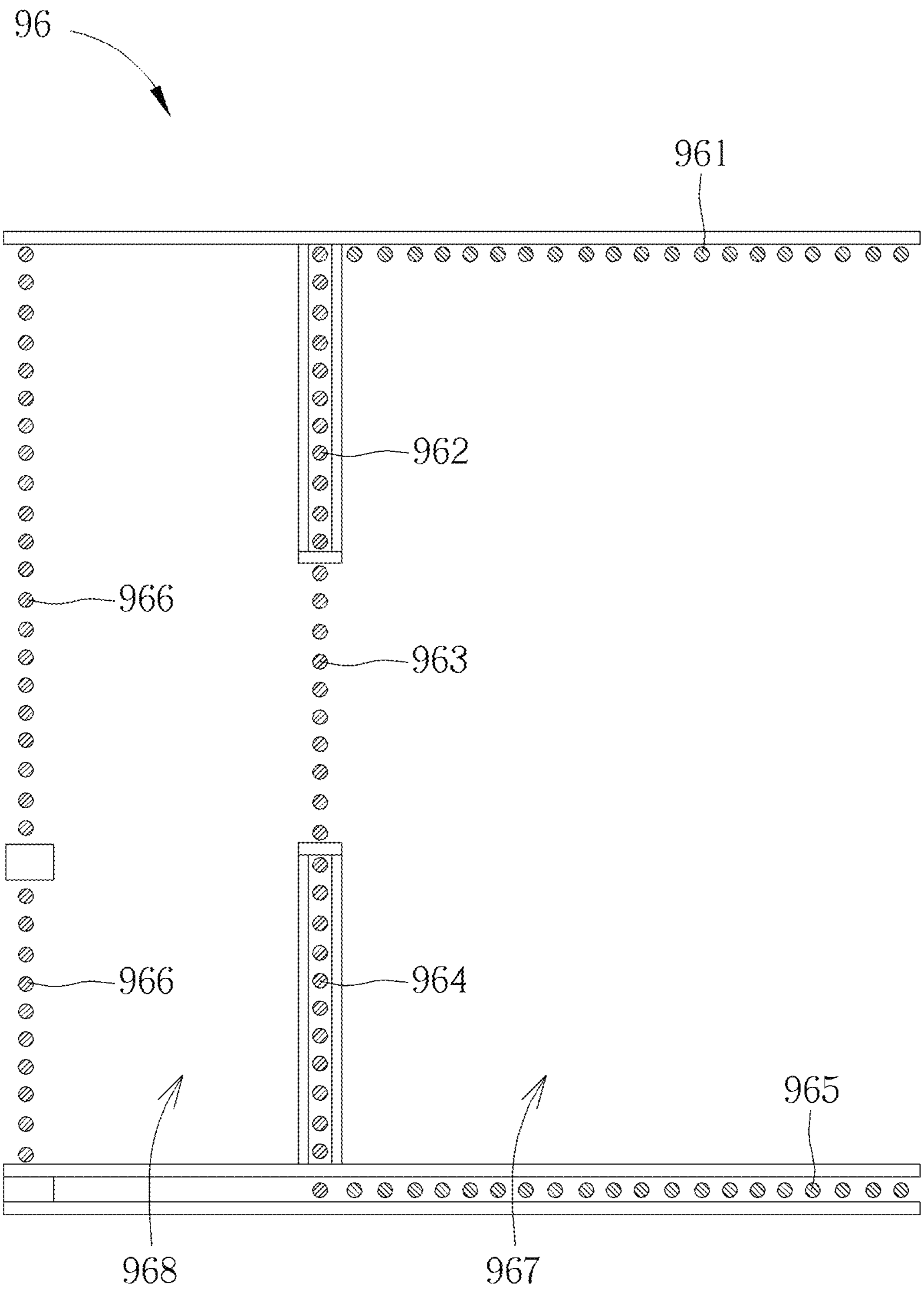
FIG. 16 illustrates a schematic diagram of a scenario of living space as an application of sound suppression system according to an embodiment of present invention.
Figure 17:
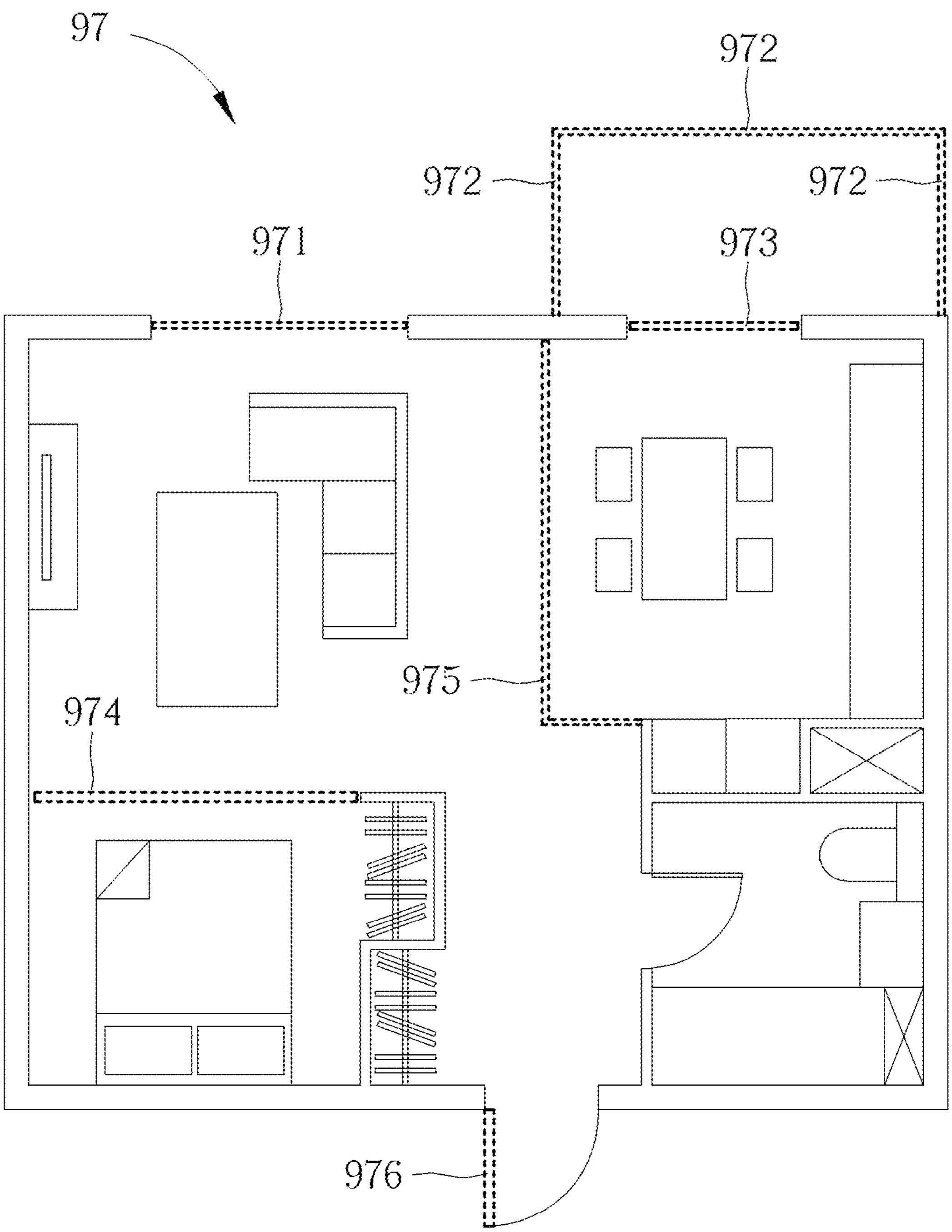
FIG. 17 illustrates a schematic diagram of a scenario of living space as an application of sound suppression system according to an embodiment of present invention.

FIGS. 16 and 17 illustrate schematic diagrams of scenario of living space as applications 96 and 97 of sound suppression system according to embodiments of present invention. For indoor room space 967 of living space 96, sound suppression systems may be installed between drywalls (e.g., construction 962/964), under ceiling (e.g., construction 961), or within floor (e.g., construction 965). For patio 968, sound suppression systems may be formed as acoustic screen and disposed on position/window 963 or position/entrance 966, which keeps both outside noise out and residents' private conversation in. For living space 97, sound suppression systems may be in form of screens (e.g., 971, 972, 973, 976, to block outside noise) or curtains (e.g., 974, 975, to partition functional space)

Furthermore, sound suppression apparatus(es) within the sound suppression system may perform loop gain and/or latency adjustment stated in the above, especially when sound suppression system consumes considerable power. For example, for application of acoustic isolation screen on patio with an area of, e.g., 80 $m^2$ (square meter), and effective noise suppression bandwidth up to 5 KHz (which may require $d_{NN}$=4 cm and a density of 1,440 ANTs/$m^2$), assuming each ANT consumes 0.87 mW (milliwatt), the total power consumption will be 100 W (watt). Hence, it may be desirable to perform the loop gain adjustment stated in the above, in order to power the total power consumption.

Figure 18:
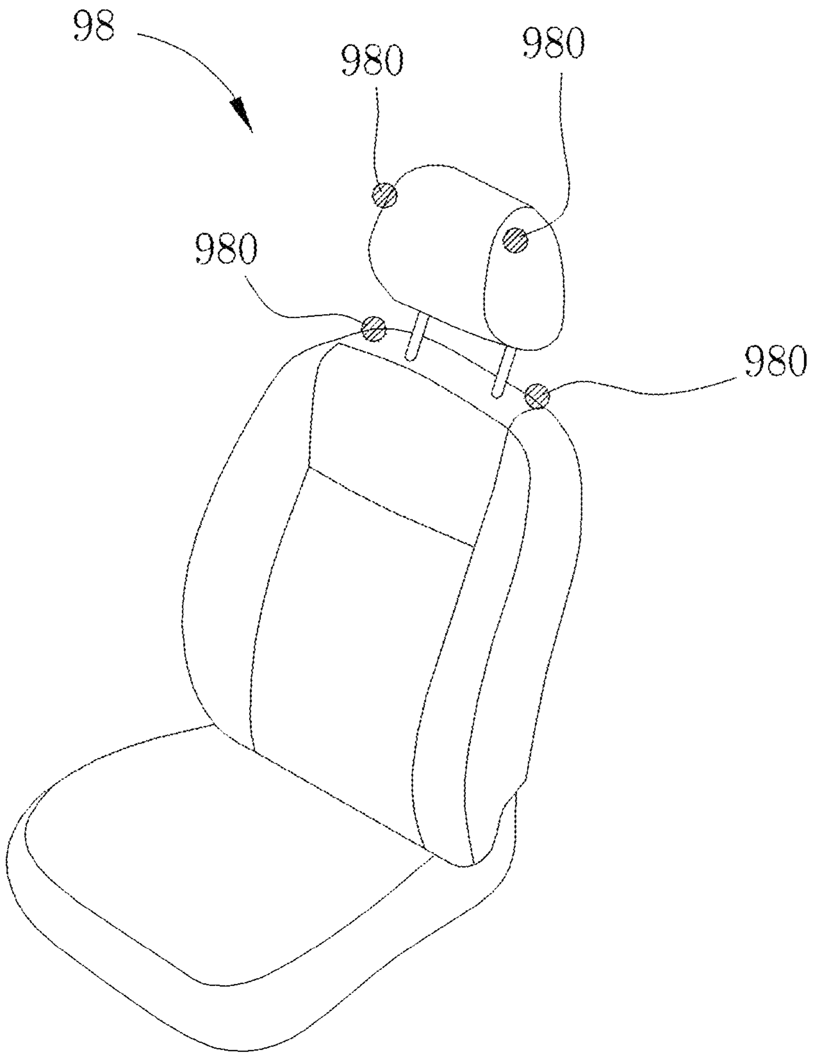
FIG. 18 illustrates a schematic diagram of a scenario of seat as an application of sound suppression apparatus according to an embodiment of present invention.

FIG. 18 illustrates a schematic diagram of a scenario of seat as an application 98 of sound suppression apparatus according to an embodiment of present invention. Sound suppression apparatuses 980 may be disposed on a seat of transportation such as vehicle, train, bus, airplane, ferry, etc.

Figure 19:
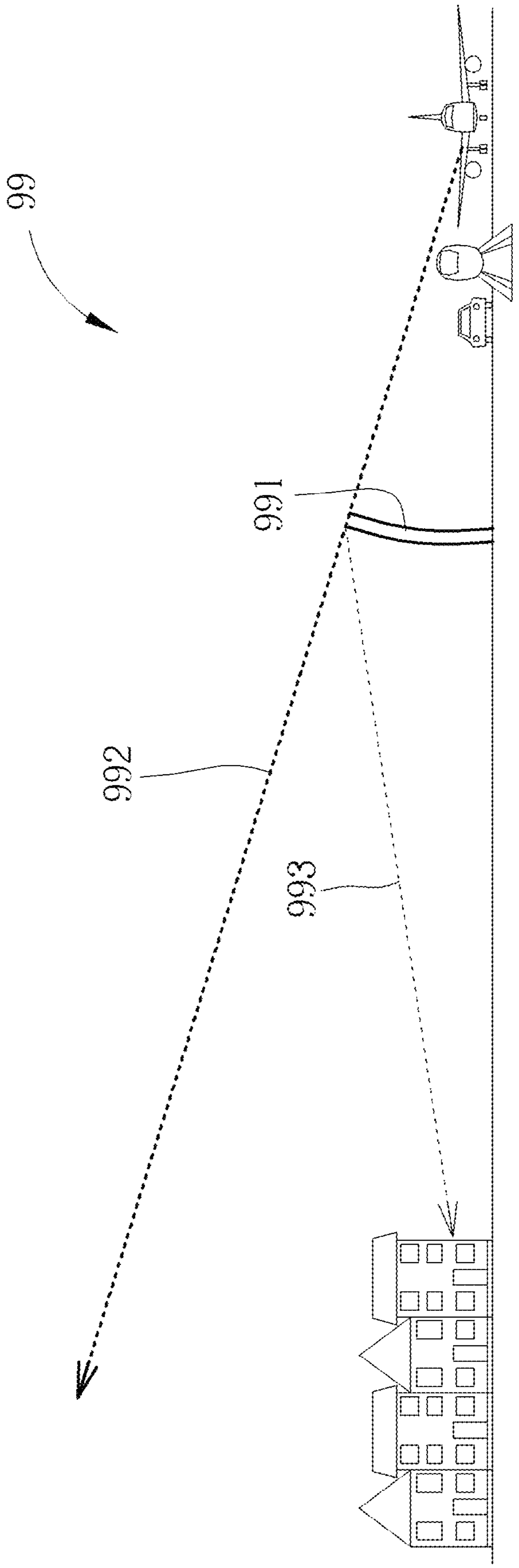
FIG. 19 illustrates a schematic diagram of a scenario of soundwall as an application of sound suppression apparatus according to an embodiment of present invention.

FIG. 19 illustrates a schematic diagram of a scenario of soundwall as an application 99 of sound suppression system according to an embodiment of present invention. Sound suppression system 90*b* may be disposed on soundwall 991. Different from conventional soundwall which may be physical blockage, where there is no active sound source on (the left side of) the physical blockage and diffraction effect occurs along the edges of the physical blockage, soundwall 991 comprises sound suppression apparatus, which is active anti-sound source and may annihilates diffraction effect.

Note that, edge diffraction may be a major reason why soundwalls typically need to be so high, and soundwalls generally is only marginally effective in highway noise containment and is generally not use in airport or railway noise containment.

The virtue of lack-of-edge-diffraction is illustrated in FIG. 18, where path 993 represents the path soundwave propagates when there is edge diffraction and path 992 represents the path soundwave propagates when there is no edge diffraction. When soundwall 991 comprises sound suppression apparatuses, soundwave along with diffraction path 993 would be weak. It will not only reduce the required height of the soundwall, but also reduce the effective noise (which reaches residential buildings).

In general, the plurality of sound suppression apparatuses/system is disposed by a noise intensive environment, e.g., construction side, bullet train station, airport runway, sidewalk, or street, aircraft cabin, deck of aircraft carrier, including by noise intensive machinery, such as military tank, MRI (magnetic resonance imaging) machine or drone.

In summary, sound producing device having compact size and being capable of producing sound over full audible bandwidth is suitable for noise/sound suppression (apparatus). Pluralities of sound suppression apparatuses arranged in certain pattern may form a sound suppression system or acoustic isolation screen, where acoustic isolation screen may provide acoustic isolation but be transmissive to light and/or airflow, enhancing privacy or human life quality.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A sound suppression apparatus, comprising:

a sound sensing device, configured to sense a sound; and a sound producing device comprising an air-pulse generating device, configured to generate a plurality of air pulses at an ultrasonic pulse rate;

wherein the plurality of air pulses at the ultrasonic pulse rate forms an anti-sound;

wherein the anti-sound comprises a component which is configured to suppress the sound.

2. The sound suppression apparatus of claim 1, wherein the sound sensing device and the sound producing device is coupled to a controller;

wherein the controller is configured to receive a sound signal from the sound sensing device and generate a control signal for the air-pulse generating device to produce the plurality of air pulses at the ultrasonic pulse rate which forms the anti-sound.

3. The sound suppression apparatus of claim 2, wherein the controller comprises a filter, configured to adjust a frequency response of the anti-sound.

4. The sound suppression apparatus of claim 1, wherein a dimension of the air-pulse generating device is less than a wavelength corresponding to a maximum noise frequency of noise to be suppressed.

5. The sound suppression apparatus of claim 1, wherein there is no back enclosure disposed on, by or under a backside of the air-pulse generating device.

6. The sound suppression apparatus of claim 1, wherein a distance between the sound sensing device and the air-pulse generating device is less than a wavelength corresponding to a maximum frequency of noise desired to be suppressed.

7. The sound suppression apparatus of claim 1, wherein the sound suppression apparatus is assembled within a wearable sound device.

8. The sound suppression apparatus of claim 7, wherein the sound sensing device is disposed within the wearable sound device such that a sensing hole of the sound sensing device faces toward an ear canal of a user when the user wears the wearable sound device;

wherein the sound producing device is disposed outside an ear canal when a user wears the wearable sound device.

9. The sound suppression apparatus of claim 1, wherein the air-pulse generating device comprises a film structure;

wherein the film structure comprises a flap pair, the flap pair comprises a first flap and a second flap disposed opposite to each other;

wherein the flap pair is actuated to perform a differential-mode movement to form an opening at an opening rate which is synchronous with the ultrasonic pulse rate.

10. The sound suppression apparatus of claim 1, wherein the plurality of air pulses forming the anti-sound propagates toward an open field;

wherein a front side of the air-pulse generating device is disposed toward an ambient of a host device of the air-pulse generating device.

11. The sound suppression apparatus of claim 1, wherein the sound sensing device and the sound producing device is coupled to a controller;

wherein the sound sensing device, the sound producing device and the controller forms a feedback control loop;

wherein the controller adaptively adjusts a loop gain or a latency of the feedback control loop.

12. The sound suppression apparatus of claim 11, wherein the controller adjusts the loop gain or the latency of the feedback control loop according to an acoustic measurement of an environment.

13. The sound suppression apparatus of claim 12, wherein the controller adjusts the loop gain to be lower when the acoustic measurement of the environment is getting lower.

14. The sound suppression apparatus of claim 12, wherein the controller adjusts the latency to be smaller when the acoustic measurement of the environment is getting higher;

wherein the controller adjusts the latency to be larger when the acoustic measurement of the environment is getting lower.

15. The sound suppression apparatus of claim 12, wherein a hysteresis is included when the controller performs the latency adjustment.

16. A sound suppression system, comprising:

a plurality of sound suppression apparatuses, arranged in an array;

wherein one of the plurality of sound suppression apparatuses comprises a sound sensing device configured to sense a sound and a sound producing device configured to produce an anti-sound;

wherein the anti-sound is configured to suppress the sound;

wherein the sound producing device comprises an air-pulse generating device configured to generate a plurality of air pulses at an ultrasonic pulse rate;

wherein the plurality of air pulses at the ultrasonic pulse rate forms the anti-sound.

17. The sound suppression system of claim 16, wherein the sound suppression apparatuses are deployed to form an acoustic screen.

18. The sound suppression system of claim 17, wherein the acoustic screen is transmissive to light or airflow.

19. The sound suppression system of claim 17, wherein the acoustic screen is used to form a private space.

20. The sound suppression system of claim 16, wherein the plurality of sound suppression apparatuses or the sound suppression system is disposed by a noise intensive environment or on a seat.

21. The sound suppression system of claim 16, wherein a height, a length, or a width of the sound producing device is less than 20 mm (millimeter).

22. An acoustic isolation method, comprising:

forming an acoustic isolation screen, wherein the acoustic isolation screen comprises the sound suppression system of claim 16;

disposing the acoustic isolation screen in a space;

wherein the acoustic isolation screen divides the space into a first subspace and a second subspace;

wherein a first sound coming from the first subspace is suppressed by the acoustic isolation screen and a suppressed first sound corresponding to the first sound propagates toward the second subspace;

wherein an acoustic magnitude of the suppressed first sound is less than an acoustic magnitude of the first sound.

23. A noise suppression method, comprising:

disposing the plurality of sound suppression apparatuses of the sound suppression system of claim 16 by a noise intensive space or a noise intensive machine or on a seat.

24. A method of forming a private space, comprising:

deploying one or more acoustic isolation screens formed by the acoustic isolation method of claim 22, so as to form a private space which is surrounded by the one or more acoustic isolation screens.

25. An acoustic isolation method, comprising:

forming an acoustic isolation screen, wherein the acoustic isolation screen is transmissive to airflow;

disposing an acoustic isolation screen in a space;

wherein the acoustic isolation screen divides the space into a first subspace and a second subspace;

wherein a first sound coming from the first subspace is suppressed by the acoustic isolation screen and a suppressed first sound corresponding to the first sound propagates toward the second subspace;

wherein an acoustic magnitude of the suppressed first sound is less than an acoustic magnitude of the first sound;

wherein the acoustic isolation screen comprises an air-pulse generating device configured to generate a plurality of air pulses at an ultrasonic pulse rate;

wherein the plurality of air pulses at the ultrasonic pulse rate forms the anti-sound.

26. The acoustic isolation method of claim 25, wherein the acoustic isolation screen is transmissive to light.

27. A wearable sound device, comprising:

a sound sensing device configured to sense a sound; and a sound producing device configured to produce an anti-sound, wherein the anti-sound comprises a component which is configured to suppress the sound;

wherein the sound producing device producing the anti-sound is located outside an ear canal when user wear the wearable sound device;

wherein the sound producing device comprises an air-pulse generating device configured to generate a plurality of air pulses at an ultrasonic pulse rate;

wherein the plurality of air pulses at the ultrasonic pulse rate forms the anti-sound.

28. The wearable sound device of claim 27, wherein the sound sensing device is in the ear canal of the user when the user wears the wearable sound device.

* * * * *